US011202336B2

United States Patent
Tsai et al.

(10) Patent No.: US 11,202,336 B2
(45) Date of Patent: Dec. 14, 2021

(54) SMALL DATA TRANSMISSION IN RADIO RESOURCE CONTROL (RRC) INACTIVE STATE

(71) Applicant: FG Innovation Company Limited, Tuen Mun (HK)

(72) Inventors: Hsin-Hsi Tsai, Taipei (TW); Heng-Li Chin, Taipei (TW); Mei-Ju Shih, Taipei (TW); Chia-Hung Wei, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 17/238,820

(22) Filed: Apr. 23, 2021

(65) Prior Publication Data

US 2021/0337625 A1 Oct. 28, 2021

Related U.S. Application Data

(60) Provisional application No. 63/014,648, filed on Apr. 23, 2020.

(51) Int. Cl.
*H04W 76/30* (2018.01)
*H04W 76/27* (2018.01)
(Continued)

(52) U.S. Cl.
CPC ......... *H04W 76/30* (2018.02); *H04W 56/001* (2013.01); *H04W 72/14* (2013.01);
(Continued)

(58) Field of Classification Search
CPC . H04W 76/30; H04W 76/27; H04W 74/0833; H04W 72/14; H04W 76/19; H04W 56/001
See application file for complete search history.

(56) References Cited

U.S. PATENT DOCUMENTS 10,965,434 B1 * 3/2021 Babaei ................... H04L 5/001
2019/0174571 A1 6/2019 Deenoo et al.
(Continued)

FOREIGN PATENT DOCUMENTS

CN 109716856 A 5/2019
WO 2019/202513 A1 10/2019

OTHER PUBLICATIONS

Samsung, Data transfer in inactive state based on 4-step RACH procedures, R2-1701529 3GPP TSG-RAN WG2 #97, Athens, Greece, Feb. 13-17, 2017.
(Continued)

Primary Examiner — Will W Lin
(74) Attorney, Agent, or Firm — ScienBiziP, P.C.

(57) ABSTRACT

Some of the present implementations provide a method for a user equipment (UE) for transmitting uplink (UL) data associated with a specific radio bearer (RB). The UE receives, while in a radio resource control (RRC)_CONNECTED state, from a base station (BS), an RRC release message that includes at least a configured grant (CG) configuration and a time alignment (TA) timer. The UE then transitions to an RRC_INACTIVE state and starts, or restarts, the TA timer in response to receiving the RRC release message. The UE transmits, while in the RRC_INACTIVE state, the UL data via a UL resource configured by the CG configuration after determining that a set of one or more criteria is met, the set of criteria including at least a criterion for the TA timer being running.

20 Claims, 4 Drawing Sheets

(51) Int. Cl.
- *H04W 76/19* (2018.01)
- *H04W 72/14* (2009.01)
- *H04W 74/08* (2009.01)
- *H04W 56/00* (2009.01)

(52) U.S. Cl.
CPC ....... *H04W 74/0833* (2013.01); *H04W 76/19* (2018.02); *H04W 76/27* (2018.02)

(56) References Cited

U.S. PATENT DOCUMENTS

| | | | |
|---|---|---|---|
| 2019/0320316 A1 | 10/2019 | Mildh et al. | |
| 2020/0045669 A1* | 2/2020 | Hwang | H04W 76/11 |
| 2020/0092779 A1* | 3/2020 | Jung | H04W 76/27 |
| 2020/0092939 A1* | 3/2020 | Kim | H04W 76/19 |
| 2020/0107268 A1 | 4/2020 | Lee et al. | |
| 2020/0107295 A1* | 4/2020 | Lee | H04W 56/0045 |
| 2020/0162897 A1 | 5/2020 | Mildh et al. | |
| 2020/0305039 A1* | 9/2020 | Jung | H04W 48/18 |
| 2020/0314713 A1* | 10/2020 | Jung | H04W 76/27 |
| 2020/0367310 A1* | 11/2020 | Jung | H04W 76/15 |
| 2020/0413476 A1* | 12/2020 | He | H04W 76/30 |
| 2020/0413477 A1* | 12/2020 | Liu | H04W 76/38 |
| 2021/0045180 A1* | 2/2021 | Lindheimer | H04W 76/27 |
| 2021/0076198 A1 | 3/2021 | Mildh et al. | |
| 2021/0127414 A1* | 4/2021 | Abdoli | H03M 13/09 |
| 2021/0127449 A1* | 4/2021 | da Silva et al. | H04W 76/27 |
| 2021/0127450 A1* | 4/2021 | Abdoli | H04W 52/0216 |

OTHER PUBLICATIONS

Nokia, Nokia Shanghai Bell, Contention resolution for Connected mode UE, R2-1907070 3GPP TSG-RAN WG2 Meeting #106, Reno, USA, May 13-17, 2019.

* cited by examiner

SMALL DATA TRANSMISSION IN RADIO RESOURCE CONTROL (RRC) INACTIVE STATE

CROSS-REFERENCE TO RELATED APPLICATION(S)

The present application claims the benefit of and priority to a provisional U.S. Patent Application Ser. No. 63/014,648, filed on Apr. 23, 2020, entitled "Method and Apparatus of Selection of UL Grant Type for Transmission in RRC INACTIVE State." The disclosure of Ser. No. 63/014,648 is hereby incorporated fully by reference into the present application.

FIELD

The present disclosure generally relates to wireless communications, and more particularly, to small data transmission by a user equipment (UE) while the UE is in an RRC_INACTIVE state in the next generation wireless networks.

BACKGROUND

With the tremendous growth in the number of connected devices and the rapid increase in user/network traffic volume, various efforts have been made to improve different aspects of wireless communication for the next-generation wireless communication system, such as the fifth-generation (5G) New Radio (NR), by improving data rate, latency, reliability, and mobility. The 5G NR system is designed to provide flexibility and configurability to optimize the network services and types, accommodating various use cases, such as enhanced Mobile Broadband (eMBB), massive Machine-Type Communication (mMTC), and Ultra-Reliable and Low-Latency Communication (URLLC).

In NR, a User Equipment (UE) may operate in, and transition between, various Radio Resource Control (RRC) states within a next generation radio access network (RAN). These different states include an RRC Connected state, an RRC Idle state, and a newly added state which is known as an RRC Inactive state. UEs with infrequent (e.g., periodic and/or non-periodic) data transmissions are generally maintained by the network in the RRC Inactive (also known as RRC_INACTIVE) state. It is noted that a UE in the RRC_INACTIVE state was not able to transmit data and had to resume the connection (e.g., move/transition to an RRC_CONNECTED state) for any downlink (DL) data reception and/or uplink (UL) data transmission. Scheduling of resources (and subsequent release of the resources), therefor, had to occur for each data transmission, regardless of how small and infrequent the data packets of each transmission were. This resulted in unnecessary power consumption and signaling overhead.

Signaling overhead due to transmission of small data packets in the UEs that are in an Inactive state can be a general problem that may become a critical issue, as the number of UEs increases, not only for the network performance and efficiency, but also for the UE's battery performance. In general, any device that has to transmit intermittent small data packets may benefit from enabling small data transmission in the Inactive state. To enable small data transmission in the Inactive state, the 3rd Generation Partnership Project (3GPP) has recently introduced some mechanisms that utilize, for example, 2-step and/or 4-step random access channel (RACH) procedures and/or configured grant (e.g., Type 1 CG) in the Inactive state. However, as these mechanisms have been introduced only recently, there exists a need for further improvements in small data transmission while the UE is in the Inactive state.

SUMMARY

The present disclosure is directed to small data transmission by a user equipment (UE) while the UE is in an RRC_INACTIVE state.

In a first aspect of the present application, a method for a user equipment (UE) for transmitting uplink (UL) data associated with a specific radio bearer (RB) is provided. The method includes receiving, while in a radio resource control (RRC)_CONNECTED state, from a base station (BS), an RRC release message that includes at least a configured grant (CG) configuration and a time alignment (TA) timer; transitioning to an RRC_INACTIVE state in response to receiving the RRC release message; starting or restarting the TA timer in response to receiving the RRC release message; and transmitting, while in the RRC_INACTIVE state, the UL data via a UL resource configured by the CG configuration after determining that a set of one or more criteria is met, the set of criteria including at least a criterion for the TA timer being running.

An implementation of the first aspect further comprises starting or restarting the TA timer further in response to receiving, from the BS, while in the RRC_INACTIVE state, an indication to update timing advance.

Another implementation of the first aspect further comprises initiating a random access (RA) procedure when determining that one of the set of criteria is not met.

In another implementation of the first aspect, the set of criteria further includes a criterion for a data volume of the UL data being lower than a threshold.

Another implementation of the first aspect further comprises initiating an RRC connection resume procedure when the data volume of the UL data is above the threshold.

In another implementation of the first aspect, the data volume is determined based on a total amount of the UL data associated with the specific RB.

In another implementation of the first aspect, the set of criteria further includes a criterion for a synchronization signal block (SSB) with reference signal received power (RSRP) being above a threshold.

In another implementation of the first aspect, the set of criteria further includes a criterion for a specific timer being running, the specific timer being started or restarted when the UE transmits the UL data via the UL resource.

In another implementation of the first aspect, the specific RB is configured for small data transmission.

In another implementation of the first aspect, the RRC release message further includes an information element (IE) suspendConfig.

In a second aspect, a UE comprising one or more non-transitory computer-readable media having computer-executable instructions for transmitting uplink (UL) data associated with a specific radio bearer (RB); and at least one processor is provided. The processor is coupled to the one or more non-transitory computer-readable media, and configured to execute the computer-executable instructions to receive, while in a radio resource control (RRC)_CONNECTED state, from a base station (BS), an RRC release message that includes at least a configured grant (CG) configuration and a time alignment (TA) timer; transition to an RRC_INACTIVE state in response to receiving the RRC release message; start or restart the TA timer in response to receiving the RRC release message; and transmit, while in the RRC_INACTIVE state, the UL data via an UL resource configured by the CG configuration after determining that a set of one or more criteria is met, the set of criteria including at least a criterion for the TA timer being running.

BRIEF DESCRIPTION OF THE DRAWINGS

Aspects of the exemplary disclosure are best understood from the following detailed description when read with the accompanying figures. Various features are not drawn to scale, and dimensions of various features may be arbitrarily increased or reduced for clarity of discussion.

DETAILED DESCRIPTION

Figure 1:
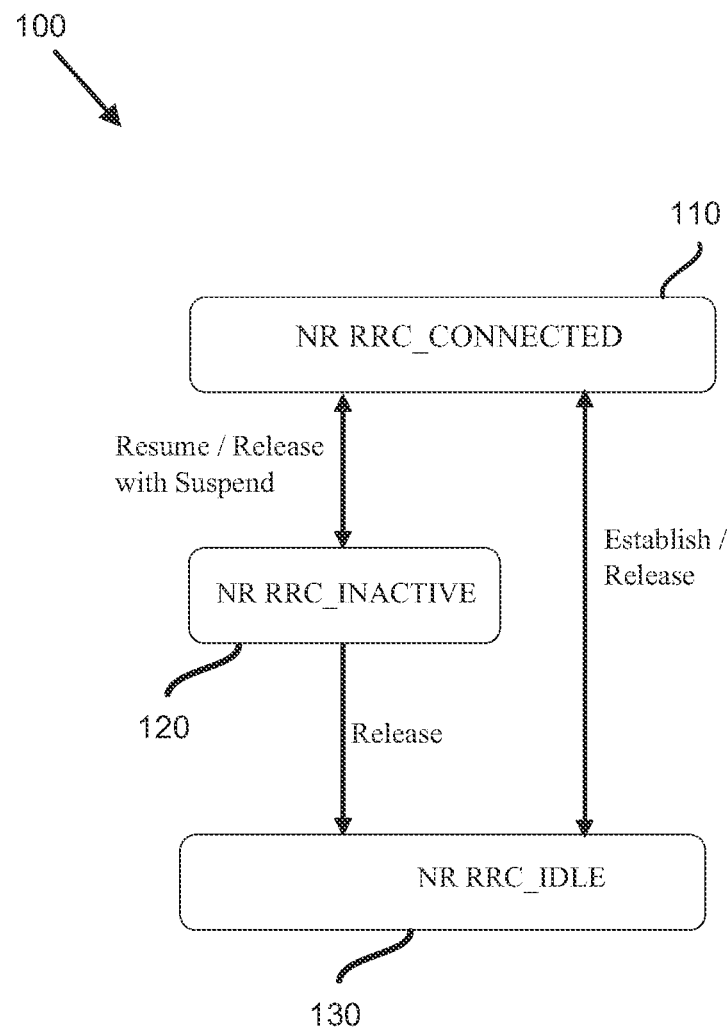
FIG. 1 is a diagram illustrating a UE state machine and the UE's state transitions, according to an example implementation of the present application.

The acronyms in the present application are defined as follows and unless otherwise specified, the acronyms have the following meanings:

| Acronym | Full name |
|---|---|
| 3GPP | 3rd Generation Partnership Project |
| 5GC | 5G Core |
| ACK | Acknowledgement |
| AMF | Access and Mobility Management Function |
| ARQ | Automatic Repeat Request |
| AS | Access Stratum |
| BCCH | Broadcast Control Channel |
| BCH | Broadcast Channel |
| BFR | Beam Failure Recovery |
| BS | Base Station |
| BSR | Buffer Status Report |
| BWP | Bandwidth Part |
| CA | Carrier Aggregation |
| CBRA | Contention Based Random Access |
| CFRA | Contention Free Random Access |
| CG | Configured Grant |
| CM | Connection Management |
| CN | Core Network |
| C-RNTI | Cell Radio Network Temporary Identifier |
| CS-RNTI | Configured Scheduling Radio Network Temporary Identifier |
| CSI-RS | Channel State Information Reference Signal |
| DCI | Downlink Control Information |
| DL | Downlink |
| DRB | Data Radio Bearer |
| DRX | Discontinuous Reception |
| HARQ | Hybrid Automatic Repeat Request |
| IE | Information Element |
| LCH | Logical Channel |
| LCG | Logical Channel Group |
| LCP | Logical Channel Prioritization |
| MAC | Medium Access Control |

-continued

| Acronym | Full name |
|---|---|
| MIB | Master Information Block |
| MSG | Message |
| NAS | Non-Access Stratum |
| NG-RAN | Next-Generation Radio Access Network |
| NR | New Radio |
| NW | Network |
| PCell | Primary Cell |
| PCCH | Paging Control Channel |
| PDCCH | Physical Downlink Control Channel |
| PDCP | Packet Data Convergence Protocol |
| PDU | Protocol Data Unit |
| PRACH | Physical Random Access Channel |
| PUCCH | Physical Uplink Control Channel |
| PUSCH | Physical Uplink Shared Channel |
| PLMN | Public Land Mobile Network |
| QoS | Quality of Service |
| RA | Random Access |
| RACH | Random Access Channel |
| RAN | Radio Access Network |
| RB | Radio Bearer |
| Rel | Release |
| RLC | Radio Link Control |
| RNA | RAN-based Notification Area |
| RNTI | Radio Network Temporary Identifier |
| RRC | Radio Resource Control |
| RSRP | Reference Signal Receiving Power |
| SCell | Secondary Cell |
| SCG | Secondary Cell Group |
| SCS | Sub Carrier Spacing |
| SDT | Small Data Transmission |
| SDU | Service Data Unit |
| SFN | System Frame Number |
| SI | System Information |
| SIB | System Information Block |
| SINR | Signal to Interference plus Noise Ratio |
| SLIV | Start and Length Indicator |
| SNPN | Stand-alone Non-Public Network |
| SR | Scheduling Request |
| SRB | Signalling Radio Bearer |
| SSB | Synchronization Signal Block |
| S-TMSI | SAE-Temporary Mobile Subscriber Identity |
| SUL | Supplementary Uplink |
| TA | Timing Advance or Time Alignment |
| TAG | Timing Advance Group |
| TS | Technical Specification |
| UE | User Equipment |
| UL | Uplink |
| UPF | User Plane Function |

The following description contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

For the purpose of consistency and ease of understanding, like features may be identified (although, in some examples, not shown) by the same numerals in the example figures. However, the features in different implementations may be differed in other respects, and thus shall not be narrowly confined to what is shown in the figures.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent. The expression "at least one of A, B and C" or "at least one of the following: A, B and C" means "only A, or only B, or only C, or any combination of A, B and C."

Additionally, for the purposes of explanation and non-limitation, specific details, such as functional entities, techniques, protocols, standard, and the like are set forth for providing an understanding of the described technology. In other examples, detailed description of well-known methods, technologies, systems, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules which may be software, hardware, firmware, or any combination thereof. The software implementation may comprise computer executable instructions stored on computer readable medium such as memory or other type of storage devices. For example, one or more microprocessors or general-purpose computers with communication processing capability may be programmed with corresponding executable instructions and carry out the described network function(s) or algorithm(s). The microprocessors or general-purpose computers may be formed of Applications Specific Integrated Circuitry (ASIC), programmable logic arrays, and/or using one or more Digital Signal Processor (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture (e.g., a Long Term Evolution (LTE) system, an LTE-Advanced (LTE-A) system, an LTE-Advanced Pro system, or a 5G NR Radio Access Network (RAN)) typically includes at least one base station, at least one UE, and one or more optional network elements that provide connection towards a network. The UE communicates with the network (e.g., a Core Network (CN), an Evolved Packet Core (EPC) network, an Evolved Universal Terrestrial Radio Access network (E-UTRAN), a 5G Core (5GC), or an internet), through a RAN established by one or more base stations.

It should be noted that, in the present application, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, a vehicle, or a Personal Digital Assistant (PDA) with wireless communication capability. The UE is configured to receive and transmit signals over an air interface to one or more cells in a radio access network.

A base station may be configured to provide communication services according to at least one of the following Radio Access Technologies (RATs): Worldwide Interoperability for Microwave Access (WiMAX), Global System for Mobile communications (GSM, often referred to as 2G), GSM Enhanced Data rates for GSM Evolution (EDGE) Radio Access Network (GERAN), General Packet Radio Service (GPRS), Universal Mobile Telecommunication System (UMTS, often referred to as 3G) based on basic wideband-code division multiple access (W-CDMA), high-speed packet access (HSPA), LTE, LTE-A, eLTE (evolved LTE, e.g., LTE connected to 5GC), NR (often referred to as 5G), and/or LTE-A Pro. However, the scope of the present application should not be limited to the above-mentioned protocols.

A base station may include, but is not limited to, a node B (NB) as in the UMTS, an evolved node B (eNB) as in the LTE or LTE-A, a radio network controller (RNC) as in the UMTS, a base station controller (BSC) as in the GSM/GSM Enhanced Data rates for GSM Evolution (EDGE) Radio Access Network (GERAN), a next-generation eNB (ng-eNB) as in an Evolved Universal Terrestrial Radio Access (E-UTRA) BS in connection with the 5GC, a next-generation Node B (gNB) as in the 5G Access Network (5G-AN), and any other apparatus capable of controlling radio communication and managing radio resources within a cell. The BS may connect to serve the one or more UEs through a radio interface to the network.

The base station may be operable to provide radio coverage to a specific geographical area using a plurality of cells included in the RAN. The BS may support the operations of the cells. Each cell may be operable to provide services to at least one UE within its radio coverage. Specifically, each cell (often referred to as a serving cell) may provide services to serve one or more UEs within its radio coverage (e.g., each cell schedules the Downlink (DL) and optionally Uplink (UL) resources to at least one UE within its radio coverage for DL and optionally UL packet transmission). The BS may communicate with one or more UEs in the radio communication system through the plurality of cells.

A cell may allocate sidelink (SL) resources for supporting Proximity Service (ProSe) or Vehicle to Everything (V2X) services. Each cell may have overlapped coverage areas with other cells. In Multi-RAT Dual Connectivity (MR-DC) cases, the primary cell of a Master Cell Group (MCG) or a Secondary Cell Group (SCG) may be referred to as a Special Cell (SpCell). A Primary Cell (PCell) may refer to the SpCell of an MCG. A Primary SCG Cell (PSCell) may refer to the SpCell of an SCG. MCG may refer to a group of serving cells associated with the Master Node (MN), including the SpCell and optionally one or more Secondary Cells (SCells). An SCG may refer to a group of serving cells associated with the Secondary Node (SN), including the SpCell and optionally one or more SCells.

As discussed above, the frame structure for NR is to support flexible configurations for accommodating various next generation (e.g., 5G) communication requirements, such as Enhanced Mobile Broadband (eMBB), Massive Machine Type Communication (mMTC), Ultra-Reliable and Low-Latency Communication (URLLC), while fulfilling high reliability, high data rate and low latency requirements. The Orthogonal Frequency-Division Multiplexing (OFDM) technology as agreed in 3GPP may serve as a baseline for NR waveform. The scalable OFDM numerology, such as the adaptive sub-carrier spacing, the channel bandwidth, and the Cyclic Prefix (CP) may also be used. Additionally, two coding schemes are considered for NR: (1) Low-Density Parity-Check (LDPC) code and (2) Polar Code. The coding scheme adaption may be configured based on the channel conditions and/or the service applications.

Moreover, it is also considered that in a transmission time interval TX of a single NR frame, a downlink (DL) transmission data, a guard period, and an uplink (UL) transmission data should at least be included, where the respective portions of the DL transmission data, the guard period, the UL transmission data should also be configurable, for example, based on the network dynamics of NR. In addition, sidelink resources may also be provided in an NR frame to support ProSe services or V2X services.

In addition, the terms "system" and "network" herein may be used interchangeably. The term "and/or" herein is only an association relationship for describing associated objects, and represents that three relationships may exist. For example, A and/or B may indicate that: A exists alone, A and B exist at the same time, or B exists alone. In addition, the character "/" herein generally represents that the former and latter associated objects are in an "or" relationship.

As discussed above, the next-generation (e.g., 5G NR) wireless network is envisioned to support more capacity, data, and services. A UE configured with multi-connectivity may connect to a Master Node (MN) as an anchor and one or more Secondary Nodes (SNs) for data delivery. Each one of these nodes may be formed by a cell group that includes one or more cells. For example, an MN may be formed by a Master Cell Group (MCG), and an SN may be formed by a Secondary Cell Group (SCG). In other words, for a UE configured with dual connectivity (DC), the MCG is a set of one or more serving cells including the PCell and zero or more secondary cells. Conversely, the SCG is a set of one or more serving cells including the PSCell and zero or more secondary cells.

As also described above, the Primary Cell (PCell) may be an MCG cell that operates on the primary frequency, in which the UE either performs the initial connection establishment procedure or initiates the connection reestablishment procedure. In the MR-DC mode, the PCell may belong to the MN. The Primary SCG Cell (PSCell) may be an SCG cell in which the UE performs random access (e.g., when performing the reconfiguration with a sync procedure). In MR-DC, the PSCell may belong to the SN. A Special Cell (SpCell) may be referred to a PCell of the MCG, or a PSCell of the SCG, depending on whether the Medium Access Control (MAC) entity is associated with the MCG or the SCG. Otherwise the term Special Cell may refer to the PCell. A Special Cell may support a Physical Uplink Control Channel (PUCCH) transmission and contention-based Random Access, and may always be activated. Additionally, for a UE in an RRC_CONNECTED state that is not configured with the CA/DC, may communicate with only one serving cell (SCell) which may be the primary cell. Conversely, for a UE in the RRC_CONNECTED state that is configured with the CA/DC a set of serving cells including the special cell(s) and all of the secondary cells may communicate with the UE.

As described above, in NR, three different RRC states, as modes of operations for a UE, are supported. These three states include RRC_CONNECTED state, an RRC IDLE state, and an RRC_INACTIVE state. A UE (or the RRC layer of the UE) may operate in one of these three RRC states. Except for a UL data transmission that is performed during an RA procedure, the UL data transmission may generally be allowed to be performed by the UE only in the RRC_CONNECTED state.

FIG. 1 is an RRC state transition diagram illustrating various RRC states and RRC transition procedures that a UE may undergo within a next generation radio access network, according to an exemplary implementation of the present application. The RRC state transition diagram 100 may include RRC_CONNECTED state 110, RRC_INACTIVE state 120, and RRC IDLE state 130. In some implementations, the RRC Connected, RRC Inactive, and RRC Idle states may be three RRC states independent of one another. As shown in FIG. 1, a UE may transition among the three RRC states.

For example, a UE may transition to RRC_INACTIVE state 120 from RRC_CONNECTED state 110 or may transition from RRC_INACTIVE state 120 to any of RRC_CONNECTED state 110 or RRC IDLE state 130. However, as shown in RRC state transition diagram 100, a UE may not transition directly from RRC Idle state 130 to RRC Inactive state 120 in some implementations. That is, a UE may transition to RRC Inactive state 120 from RRC Idle state 130 through RRC Connected state 110 in some such implementations. In some aspects of the present implementations, a UE may also transition from RRC Connected state 110 to RRC Inactive state 120 using an RRC Suspend (or RRC Release with Suspend) procedure. Conversely, the UE may transition from RRC Inactive state 120 to RRC Connected state 110 using an RRC (Connection) Resume procedure. Additionally, the UE may use an RRC Release procedure to transition from RRC Connected state 110 or RRC Inactive state 120 to RRC Idle state 130, while using an RRC Establish procedure to transition from RRC Idle state 130 to RRC Connected state 110.

In some implementations, in an RRC_INACTIVE state, a UE may remain as Connection Management (CM)-CONNECTED (e.g., where the UE has signaling connection with AMF) and may move within an area configured by the NG-RAN (e.g., RNA) without notifying the NG-RAN. In the RRC_INACTIVE state, the last serving cell (e.g., associated with a gNB) may keep the UE context and the UE-associated NG connection with the serving AMF and UPF.

In some implementations, the RRC_INACTIVE state may support various functions and/or characteristics, such as, small data transmission (SDT), PLMN selection, broadcast of system information, cell re-selection mobility, paging initiated by NG-RAN (RAN paging), RAN-based notification area (RNA) managed by NG-RAN, DRX for RAN paging configured by NG-RAN, 5GC-NG-RAN connection (e.g., both control/user (C/U)-planes) established for the UE, UE AS context stored in NG-RAN and the UE, NG-RAN determining the RNA to which the UE belongs, etc. In some implementations, for NR connected to 5GC network, a UE's identity (e.g., I-RNTI) may be used to identify the UE context in the RRC_INACTIVE state. The I-RNTI may provide the new NG-RAN node with a reference to the UE context corresponding the old NG-RAN node.

In some implementations, the AS Context for a UE in RRC_INACTIVE state may be stored when the connection is suspended (e.g., when the UE is in an RRC_INACTIVE state) and may be restored/retrieved when the connection is resumed (e.g., when the UE transitions from the RRC_INACTIVE state to an RRC_CONNECTED state). The suspension of the RRC connection may be initiated by the network. When the RRC connection is suspended, the UE may store the UE Inactive AS context (and any related configuration received from the network), and may transition to an RRC_INACTIVE state. If the UE is configured with SCG, the UE may release the SCG configuration upon initiating an RRC Connection Resume procedure. The RRC message to suspend the RRC connection may be integrity-protected and ciphered. Resumption from a suspended RRC connection may be initiated by upper layers when the UE needs to transition from an RRC_INACTIVE state to an RRC_CONNECTED state, or by the RRC layer to perform an RNA update, or by RAN paging, for example, from NG-RAN. When the RRC connection is resumed, the network may configure the UE according to the RRC connection resume procedure and based on the stored UE Inactive AS context (and any related RRC configuration received from the network). The RRC connection resume procedure may reactivate the AS security and reestablish the SRB(s) and DRB(s).

In some implementations, in response to a request to resume an RRC connection, the network may perform any of the following procedures. In some implementations, in response to such a request, the network may resume the suspended RRC connection and send the UE to an RRC_CONNECTED state, or may reject the request and send the UE to an RRC_INACTIVE state (e.g., with a wait timer). In some other implementations, the network may directly re-suspend the RRC connection in response to the request and send the UE to an RRC_INACTIVE state, or may directly release the (RRC) connection and send the UE to an RRC_IDLE mode. In yet other implementations, in response to a request to resume the RRC connection, the network may instruct the UE to initiate a NAS level recovery (e.g., by sending an RRC setup message to the UE).

In addition, in the RRC_INACTIVE state, the upper layers (or the RRC layer) may configure a UE's specific DRX. The UE's controlled mobility may be based on the network configuration in the RRC_INACTIVE state, and the UE may store the UE Inactive AS context. Additionally, a RAN-based notification area may be configured by the RRC layer when the UE is in the RRC_INACTIVE state. Furthermore, the UE may perform other functions while in the RRC_INACTIVE state, such as monitoring Short Messages (e.g., that are transmitted with P-RNTI over DCI); monitoring a Paging channel for CN paging (e.g., using 5G-S-TMSI) and RAN paging (e.g., using full I-RNTI); performing neighboring cell measurements and cell (re-)selection; performing RAN-based notification area updates periodically and/or when moving outside the configured RAN-based notification area; and acquiring system information and sending SI request (e.g., if configured).

Random Access Procedure

In some implementations, two types of random access (RA) procedures may be supported/configured for the UE. For example, 4-step RA type with MSG1 and 2-step RA type with MSGA. Both types of RA procedure support contention-based random access (CBRA) and contention-free random access (CFRA).

The UE selects the type of random access at initiation of the random access procedure based on the network configuration, for example, as follows:
  when CFRA resources are not configured, an RSRP threshold may be used by the UE to select between 2-step RA type and 4-step RA type;
  when CFRA resources for 4-step RA type are configured, UE may perform RA with 4-step RA type; and/or
  when CFRA resources for 2-step RA type are configured, UE may perform RA with 2-step RA type.

Figure 2A:
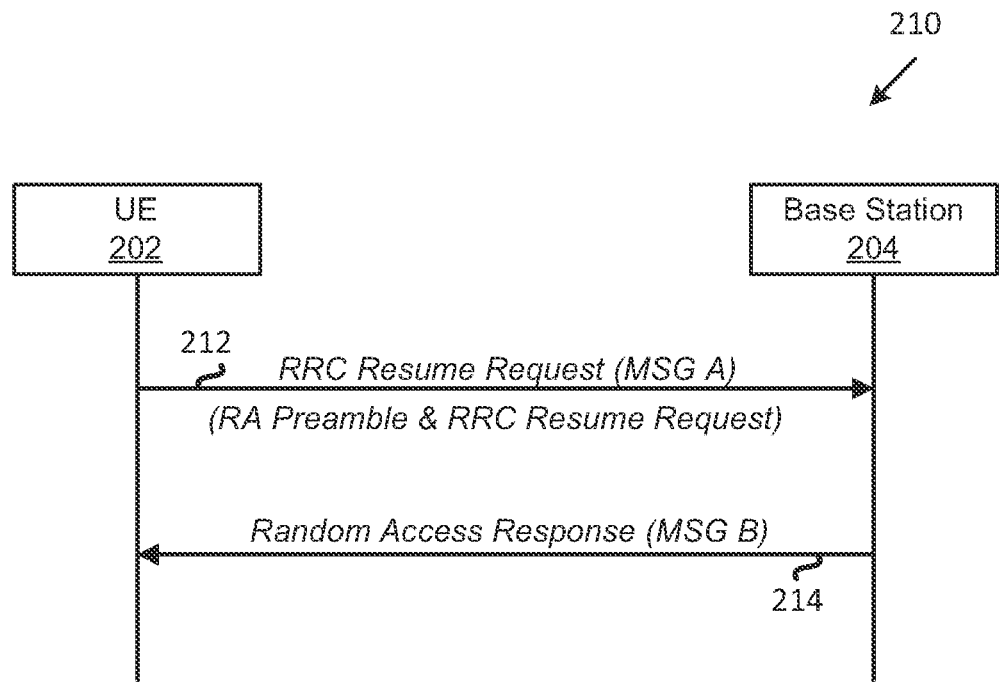
FIG. 2A is a diagram illustrating a random access (RA) procedure with 2-step RA type (e.g., for small data transmission), according to an example implementation of the present application.

FIG. 2A is a diagram 210 illustrating a random access procedure with 2-step RA type (e.g., for small data transmission), according to an example implementation of the present application. Diagram 210 includes UE 202 and base station 204 (e.g., a gNB), where UE 202 may transmit an RRC resume request and/or uplink (UL) data (e.g., small data) to base station 204 via a random access procedure with 2-step RA type.

As illustrated in FIG. 2A, action 212 includes UE 202 transmitting a random access (RA) preamble and/or a RRC resume request (e.g., MSG A) to base station 204. MSG A may include a RACH resource and a PUSCH payload. The RA preamble may be transmitted via the RACH resource of MSG A. The RRC resume request may be transmitted via the PUSCH payload of MSG A. Base station 204 may configure the RACH resources which may be used to let UE 202 transmit the RA preamble. In some implementations, the RACH resources may be configured specifically for the small data transmission purpose. UE 202 may select a RACH resource (for a small data transmission purpose) from the configured RACH resources (e.g., prescribed by combinations of time resources, frequency resources, and sequence resources). Then, UE 202 may transmit the RA preamble using the selected RACH resource of MSG A, e.g., for the purpose of small data transmission. UE 202 may transmit the RRC resume request via the PUSCH payload of MSGA. The UL data (e.g., small data) may also be multiplexed with the RRC resume request to be transmitted via the PUSCH payload of MSG A.

As illustrated in FIG. 2A, action 214 includes base station 204 transmitting a random access response (RAR) (e.g., MSG B) to UE 202. for example, when base station 204 detects the RA preamble and/or the UL data). For UL data transmission (e.g., small data transmission), base station 204 may provide an acknowledge (ACK)/non-acknowledgement (NACK) message in MSG B to indicate to UE 202 whether base station 204 has received the UL data in MSG A successfully or not.

Figure 2B:
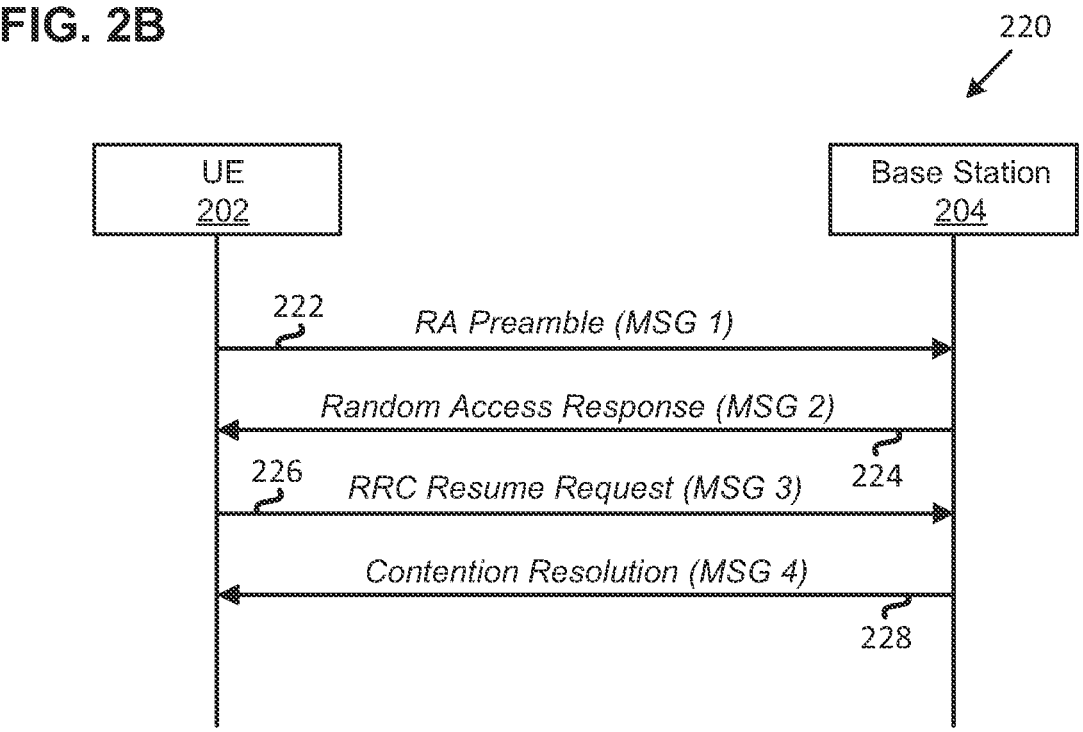
FIG. 2B is a diagram illustrating a random access procedure with 4-step RA type (e.g., for small data transmission), according to an example implementation of the present application.

FIG. 2B is a diagram 220 illustrating a random access procedure with 4-step RA type (e.g., for small data transmission), according to an example implementation of the present application. Diagram 220 includes UE 202 and base station 204 (e.g., a gNB), where UE 202 may transmit an RRC resume request and/or UL data (e.g., small data) to base station 204 via a random access procedure with 4-step RA type.

As illustrated in FIG. 2B, action 222 includes UE 202 transmitting an RA preamble (e.g., MSG 1) to base station 204. Base station 204 may configure RACH resources which may be used to let UE 202 transmit the RA preamble. In some implementations, the RACH resources may be configured specifically for small data transmission purpose. In some implementations, UE 202 may select a RACH resource (for small data transmission purpose) from the configured RACH resources (e.g., prescribed by combinations of time resources, frequency resources, and sequence resources). Then, UE 202 may transmit the RA preamble using the selected RACH resource, e.g., for small data transmission purpose.

Action 224 includes base station 204 transmitting a RAR (e.g., MSG 2) to UE 202, for example, when base station 204 detects the RA preamble. The RAR may be transmitted over the entire cell covered by base station 204, since base station 204 may not have been able to identify UE 202 that transmitted the RA preamble. For example, a physical downlink shared channel (PDSCH) resource in which the RAR is mapped may be indicated by base station 204 to UE 202 via a physical downlink control channel (PDCCH). Also, the RAR may contain information relating to a resource to be used by UE 202 in uplink or information relating to uplink transmission timing for UE 202.

Action 226 includes UE 202 transmitting an RRC resume request (e.g., MSG 3) using the uplink resource (e.g., PDSCH resource) provided by base station 204 via the RAR in action 224. In some of the present implementations, UE 202 may transmit an RRC Resume Request message to base station 204, where the RRC Resume Request message may or may not be requesting for transitioning to an RRC_CONNECTED state. In some implementations, the UL data (e.g., small data) may also be multiplexed with the RRC Resume Request message to be transmitted via MSG 3.

Action 228 includes base station 204 transmitting a PDCCH transmission for contention resolution (e.g., MSG 4) to UE 202. In some of the present implementations, base station 204 may provide an acknowledge (ACK)/non-acknowledgement (NACK) message in MSG 4 to indicate to UE 202 whether base station 204 has received the UL data in MSG 3 successfully or not.

In some implementations, MSGA of the RA procedure with 2-step RA type may include a preamble on PRACH and a payload on PUSCH. In some such implementations, after the MSGA transmission, the UE may monitor for a response from the network within a configured window. For the CFRA, upon receiving the network response, the UE may end the random access procedure. For CBRA, if contention resolution is successful, for example, upon receiving the network response, the UE may end the random access procedure. if fallback indication is received in MSGB, the UE may perform the MSG3 transmission and monitor contention resolution. If contention resolution is not successful after MSG3 (re)transmission(s), the UE may go back to the MSGA transmission. In some implementations, if the random access procedure with 2-step RA type is not completed after a number of MSGA transmissions, the UE may be configured to switch to CBRA with 4-step RA type.

For random access in a cell configured with SUL, the network may explicitly signal which carrier may be used (e.g., UL or SUL carrier), otherwise, the UE may select the SUL carrier if the measured quality of the DL is lower than a broadcast threshold. The UE may perform a carrier selection before selecting between the RA procedure with 2-step or 4-step RA type. The RSRP threshold for selecting between the 2-step and 4-step RA types may be configured separately for UL and SUL. Once started, all uplink transmissions of the random access procedure may remain on the selected carrier.

Configured Grant

In some implementations, in the uplink, a base station (e.g., a gNB) may dynamically allocate resources to the UEs, for example, via the C-RNTI/CS-RNTI on PDCCH(s). A UE may monitor the PDCCH(s) in order to find possible configured grants for the uplink transmission when its downlink reception is enabled (e.g., the UE may activity governed by the DRX when configured). When CA is configured, the same C-RNTI/CS-RNTI may apply to all serving cells. In addition, with Configured Grants, the base station may allocate the uplink resources for the initial HARQ transmissions to the UEs.

In some implementations, two types of configured uplink grants may be configured. With Type 1 configured grant (CG), the RRC signaling may directly provide the configured uplink grant (e.g., including the periodicity). With Type 2 CG, the RRC signaling may define the periodicity of the configured uplink grant, while the PDCCH addressed to the CS-RNTI may either signal and activate the configured uplink grant, or deactivate it. That is, a PDCCH addressed to the CS-RNTI may indicate that the uplink grant can be implicitly reused according to the periodicity defined by the RRC signaling, until deactivated.

Type 1 and Type 2 CGs are configured by the RRC signaling per Serving Cell and per BWP in some implementations. In some such implementations, multiple configurations may be active simultaneously, e.g., on different Serving Cells. For Type 2 CG, activation and deactivation may depend on the Serving Cells. For the same Serving Cell, the UE/MAC entity may be configured with either Type 1 or Type 2.

In some implementations, RRC may configure different parameters when the configured grant Type 1 is configured. For example, RRC may configure a cs-RNTI parameter used for retransmission; a periodicity parameter that indicates a periodicity of the configured grant Type 1; a timeDomainOffset parameter that indicates the Offset for a resource with respect to SFN=0 in time domain; a timeDomainAllocation parameter for the allocation of configured uplink grant in time domain, which may contain startSymbolAndLength (e.g., SLIV in Technical Specification 38.214); and a nrof-HARQ-Processes parameter that indicates the number of HARQ processes for configured grant.

Upon configuration of a configured grant Type 1 for a Serving Cell (e.g., by the upper layers), the UE/MAC entity may store the uplink grant provided by the upper layers, as a configured uplink grant for the indicated Serving Cell. The UE/MAC entity may also initialise or re-initialise the configured uplink grant to start in a symbol according to the timeDomainOffset and S (derived from SLIV as specified in Technical Specification (TS) 38.214) parameters, and to reoccur with periodicity.

As described above, in NR, small UL data transmission (SDT) in an RRC_INACTIVE state may be possible. The solution for small data transmission in the RRC_INACTIVE state may be service agnostic, resulting in different service requirements. In some implementations, small data transmission may be implemented by using a RACH-based mechanism (e.g., through an RA procedure with 2-step and/or 4-step RA type) and/or using preconfigured PUSCH resources (e.g., the configured grant type 1).

The UE AS context (e.g., UE Inactive AS Context) used for the uplink data transmission in an RRC_INACTIVE state may be similar to the one used in an state transition from RRC_INACTIVE state to an RRC_CONNECTED state. The UE AS context may be located and identified in the network via an "AS Context ID," which may be allocated by the network and stored in the UE (e.g., as well as in the network) when the UE transitions to the RRC_INACTIVE state and may be used to locate the AS context when the UE tries to transmit small data and/or to perform a transition to the RRC_CONNECTED state. The UE AS Context may be stored in an "anchor"/source base station and may be fetched by the new serving base station when needed, for example, upon the triggering a small data transmission and/or transitioning from the RRC_INACTIVE to RRC_CONNECTED state. The UE ID may be able to uniquely identify the UE context in the RAN.

Small data transmission may use the AS Context ID transmitted in the "first" message for contention resolution (e.g., at least when RACH is used). After the "first" message with small data is received, the network may be able to inform the UE that it may move to an RRC_CONNECTED state, for example, via a DL RRC message (e.g., RRCConnectionResume message). The "first" message with small data may provide information to enable the network to apply overload control and prioritisation, if needed. The UE may provide the network, in the "first" message with the initial uplink data transmission, all necessary information to enable the network to move the UE to the RRC_CONNECTED state, or to enable the network to let the UE remain in the RRC_INACTIVE state. For example, the information may include a BSR.

Small data transmission may support at least RLC ARQ mechanisms in some implementations. The network may have the ability to perform a context update when the UE sends small data in RRC_INACTIVE state. That context update may rely on RRC signaling and may be done in the "second" message (e.g., RRCConnectionResume message or a control response message triggered by the small data transmission). The UE context in the RRC_INACTIVE state may include the configuration of radio bearers, logical channels, security, etc. The UE may maintain the same PDCP entity as in the RRC_CONNECTED state and maintain the PDCP COUNT and the SN of the PDCP entity.

One or more specific RBs (e.g., DRBs and/or SRBs) may be maintained in the RRC_INACTIVE state, and small data transmission may take place on a DRB(s) and/or a SRB(s) associated with the concerned service. For small data transmission in the RRC_INACTIVE state, the UE may perform small data transmission for the configured RBs (e.g., DRBs and/or SRBs which are configured for small data transmission). If bearers with configured QoS are allowed to be used for UL small data transmission, the QoS may be still required to be met.

In some implementations, an RRC Connection Resume Request may contain at least the required information for the network to perform a contention resolution procedure, identify the UE AS context, and verify the right UE. Upon receiving a response from the network (e.g., a RRC Connection Resume message), the UE may be able to identify the right network, perform a contention resolution procedure, and receive DL data and either remain in the RRC_INACTIVE state or resume its previously suspended connection (e.g., to move to the RRC_CONNECTED state). DL transmissions/responses and subsequent UL transmissions may be supported without the UE having to move to the RRC_CONNECTED state.

HARQ ACK/NACK transmissions may be supported when a MSG3 is transmitted (e.g., the UE is expected to continuously monitor the DL PDCCH once it sends first UL packet, and DL RLC ACK/NACK messages may be scheduled normally when a UE still listens to the DL channels). The UE may provide the network with information, such that to enable the network to decide whether to leave the UE in the RRC_INACTIVE state or move the UE to the RRC_CONNECTED state.

In some implementations, MSG 1 may be used for RA preamble transmission of the random access procedure with 4-step RA type; MSG3 may be used for first scheduled transmission of the random access procedure; MSG A may be used for RA preamble and PUSCH payload transmissions of the random access procedure with 2-step RA type; and MSGB may be used for responding to MSG A in the random access procedure with 2-step RA type. In some aspects of the present implementations, MSG B may include one or more responses for contention resolution, fallback indication(s), and/or backoff indication.

Configurations to Support UL/Small Data Transmission in the RRC_INACTIVE State

As described above, UL data transmission (e.g., SDT) may be supported in the RRC_INACTIVE state. Based on the RRC state machine and state transitions in NR, as described above with reference to FIG. 1, the RRC state of a UE may be controlled by the NW. Specifically, the NW may switch the RRC state of a UE to an RRC_INACTIVE state from an RRC_CONNECTED state by transmitting an RRC release message (e.g., with suspend configuration) to the UE. In some aspects of the preset implementations, if a UE is in an RRC_IDLE state, the RRC state of the UE may have to be switched to an RRC_CONNECTED state first, before switching its state to RRC_INACTIVE. In other words, the RRC state of the UE may not be switched to RRC_INACTIVE directly from RRC_IDLE state in some implementations.

In some implementations, the UL data transmission configuration(s) may be configured via an RRC release with suspend configuration or via a specific configuration for UL data transmission included in an RRC release command (and/or in a suspend configuration in an RRC release message). Alternatively, the UL data transmission (e.g., SDT) configuration(s) may be preconfigured via a specific RRC configuration(s). For example, through a dedicated RRC signaling, the UE may receive the SDT configuration(s) via an RRC reconfiguration message (e.g., from a serving cell, while the UE is in an RRC_CONNECTED state).

The UL data transmission (e.g., SDT) configuration(s) may include one or more of a 4-step RACH configuration, a 2-step RACH configuration, a Configured Grant configuration, a Radio Bearer configuration, a BWP indicator, a UE (context) ID, a Time Alignment (TA) configuration, a Paging configuration, a RAN notification area configuration, etc. These configurations, which are described in more detail below, may be applied by a UE, for example, when the UE is configured to support UL data transmission in an RRC_INACTIVE state. More specifically, upon the UE receiving the UL data transmission configuration(s), the UE may enter an RRC_INACTIVE state. In some implementations, the UL data transmission (e.g., SDT) configuration(s) may be applied when the UE is in an RRC_INACTIVE state.

RACH configuration: In some implementations, a specific preamble(s) and/or PRACH resource(s) for SDT may be configured. The specific preamble(s) and/or PRACH resource(s) may be associated with a specific grant size for an MSG3. The UE may select a preamble and/or PRACH resource to initiate an RA procedure for SDT (e.g., the UL data transmission in the RRC_INACTIVE state) based on some criteria (e.g., based on RB, TA, data volume, buffer status, channel quality, etc.). In some implementations, the RACH configuration may be included in the RRC release message.

2-Step RACH configuration: In some implementations, a specific preamble(s), PRACH resource(s), and/or MSGA PUSCH(s) for SDT may be configured. The specific preamble(s) and/or PRACH resource(s) may be associated with a specific grant size for an MSG A PUSCH. The UE may select a preamble, PRACH resource, and/or the associated MSG A PUSCH, for SDT, based on some criteria (e.g., based on RB, TA, data volume, buffer status, channel quality, etc.). In some implementations, the 2-step RACH configuration may be included in the RRC release message.

Configured Grant configuration: In some implementations, the configured grant configuration included in the UL data transmission (e.g., SDT) configuration may include one or more parameters as listed in the IE ConfiguredGrantConfig, for example, as described in 3GPP TS 38.321 (e.g., the periodicity of the configured grant, the size of the UL resource, the duration of the UL resource, etc.), and/or other parameters (e.g., a number and/or a threshold which may be used for the release of the CG, a TA timer for TA validity, an RSRP threshold, a time offset, a UE-specific RNTI, a configured grant ID, and/or a timer/window for the response of the UL transmission via configured grant, a number of HARQ process(s), etc.). In some implementations, the CG configuration may be included in the RRC release message.

As described above, the configured grant configuration may be a Type 1 and/or Type 2 configured grant. The configured grant configuration may include a contention-based resource and/or a contention free resource. Such configured grant configuration may only be used in the RRC_INACTIVE state and/or may be used in both RRC_CONNECTED and RRC_INACTIVE states. The configured grant configuration may include a dedicated UL resource for a UE. The UE may be configured with multiple configured grant configurations that, for example, are used for transmission in the RRC_INACTIVE state. More specifically, the number of transmissions via the configured grant may be configured in the configured grant configuration. For example, if the number of transmissions is 2, the UE may only use the configured grant twice for transmission.

In some implementations, the UE may maintain a counter, and deduct one from the counter after each transmission via the configured grant/resource. In some such implementations, if the counter reaches zero, the UE may clear/release the configured grant configuration or the configured grant resource. More specifically, a timer may be configured in the configured grant configuration in some implementations. Such a timer may be used to reflect whether the configured grant/resource is valid or not. In some implementations, the configured grant configuration or the configured grant resource may only be valid while the timer is running (e.g., is not expired or reached zero).

Radio Bearer configuration: In some implementations, one or more of the specific SRBs and/or DRBs may be configured for SDT. In some implementations, the specific SRBs and/or DRBs may be resumed when the UE initiates a SDT procedure. In some implementations, the specific SRBs and/or DRBs may not be suspended when the RRC state of the UE is switched to the RRC_INACTIVE state (e.g., when the UE receives an RRC release with suspend configuration and/or a SDT configuration). In some implementations, the radio bearer configuration may be included in the RRC release message.

BWP Indicator: In some implementations, a specific BWP (ID) may be configured for the UE to use in the RRC_INACTIVE state (e.g., for SDT). For example, if the UE receives the BWP indicator and/or if the UE initiates a SDT procedure, the UE may switch the active BWP to the indicated/configured BWP (e.g., through the BWP indicator) when entering the RRC_INACTIVE state. In the RRC_INACTIVE state, the UE may receive the system information that is broadcast on the indicated BWP. The indicated/configured BWP may be config with CG configuration. The UE may then perform UL data transmission (e.g., via configured grant) on the indicated/configured BWP. The indicated/configured BWP may be an initial BWP, a default BWP, and/or a specific BWP. In some implementations, the BWP indicator may be included in the RRC release message.

UE (Context) ID: In some implementations, the UE (Context) ID may be referred to a specific RNTI (e.g., I-RNTI, full I-RNTI, short I-RNTI, C-RNTI, CS-RNTI, a specific RNTI for SDT, etc.), the UE AS context ID, the UE Inactive AS context, etc. The UE ID may be transmitted together with the UL data transmission in some implementations. For example, the UE ID may be transmitted via MSG1, MSG 3, MSGA, and/or UL resources derived from the configured grant. The UE ID, in some implementations, may be used by the UE when a request for UL data transmission (e.g., via configured grant) is received. In some implementations, the UE (Context) ID may be included in the RRC release message.

Time Alignment (TA) configuration: In some implementations, a specific TA timer may be configured for the UE to use in the RRC_INACTIVE state. In some implementation, when the UE receives the TA configuration, the UE may (re)start a specific TA timer. In some implementation, when the UE receives a specific Timing Advance command (e.g., via a paging message, a short message, and/or other DL signaling, such as via PDCCH and/or a specific DCI format), the UE may apply the Timing Advance command and/or (re)start a specific TA timer. The timing advance command (e.g., Timing Advance command MAC CE) may be used to update the TA value for UL synchronization. While the specific TA timer is running (e.g., is not expired or reached zero), the UE may determine that the TA is valid. If the specific TA timer expires (or not running), the UE may determine that the TA is not valid. In some implementations, the UE may only use the configured grant for transmission in the RRC_INACTIVE state if the TA is determined to be valid. Otherwise, the UE may initiate an RRC connection resume procedure and/or a random access procedure if the TA is determined not to be valid and, at the same time, the UE is required to transmit UL data in (e.g., in the RRC_INACTIVE state). In some implementations, the Time Alignment (TA) configuration may be included in the RRC release message.

Paging configuration: In some implementations, Paging cycle may be configured for UL data transmission while the UE is in the RRC_INACTIVE state. In some implementations, the Paging configuration may be included in the RRC release message.

RAN Notification Area configuration: In some implementations, a RAN notification area configuration may include a list of cell IDs, a ran area configuration list, a list of RAN area codes (RANACs), a list of RAN area IDs, and/or a list of tracking area codes. A specific timer for RAN notification area (e.g., similar to t380 introduced by 3GPP) may be configured for the UE. In some implementations, the RNA configuration may be included in the RRC release message.

As described above, the UL data transmission (e.g., SDT) configuration(s) and the corresponding parameters may be configured via an RRC release message (e.g., with suspend configuration). In some implementations, when a UE in the RRC_CONNECTED state receives the UL data transmission configuration(s)/SDT configurations (e.g., RACH configuration, 2-step RACH configuration, Configured Grant configuration, Radio Bearer configuration, BWP Indicator, UE (Context) ID, Time Alignment (TA) configuration, Paging configuration, and/or RAN Notification Area configuration), the UE may switch its RRC state to the RRC_INACTIVE state, and may apply the UL data transmission (e.g., SDT) configuration(s). The UE may perform UL and/or DL data transmission following the UL data transmission (e.g., SDT) configuration(s) in the RRC_INACTIVE state, for example, without a need to perform state transitioning to the RRC_CONNECTED state. Furthermore, the UE may or may not reset the MAC entity (or may partially reset the MAC entity). The UE may or may not release the default MAC Cell Group configuration.

Selection of UL Grant Type for UL/Small Data Transmission in an RRC_INACTIVE State In some of the present implementations, the UE/MAC entity may determine how to use the received or configured UL grant. If the UE has received a UL grant or there is a configured UL grant (e.g., a CG configuration which is activated/initialized), the UE/MAC entity may determine the UL grant to be for a new transmission or retransmission (e.g., based on a New Data Indicator (NDI)). As a result, the UE/MAC entity may deliver this UL grant and the associated HARQ information (e.g., the NDI, Transport Block size (TBS), Redundancy Version (RV), and/or HARQ process ID) to the HARQ entity of the UE.

For each UL grant, the HARQ entity of the UE may identify a HARQ process associated with the corresponding UL grant. For each identified HARQ process, the HARQ entity of the UE may determine the type of the corresponding UL grant (e.g., whether the UL grant is for new transmission or for retransmission, whether the UL grant was received in a RAR, whether the UL grant is a configured grant, etc.). The HARQ entity of the UE may then obtain a MAC PDU (e.g., to transmit) from the multiplexing and assembly entity of the UE. If a MAC PDU to transmit has been obtained, the HARQ entity of the UE may deliver the MAC PDU and the UL grant and the HARQ information of the TB (e.g., the MAC PDU) to the identified HARQ process. If the HARQ entity of the UE requests a new transmission for a TB, the HARQ process of the UE may store the MAC PDU in the associated HARQ buffer, store the UL grant received from the HARQ entity, and/or generate a transmission. If the HARQ entity of the UE requests a retransmission for a TB, the HARQ process of the UE may store the uplink grant received from the HARQ entity, and/or generate a transmission. To generate a transmission for a TB, the HARQ process of the UE may instruct the physical layer to generate a transmission according to the stored UL grant.

In some implementations, a UE may generate the data (e.g., MAC PDU/TB) for transmission when the UE receives a UL grant, or before the transmission time of (each) configured grant (e.g., the staring symbol of a PUSCH resource). To generate the data for transmission, the UE/MAC entity may perform a Multiplexing and Assembly procedure and/or an LCP procedure to acquire the data from the logical channel(s) and/or generated MAC CE(s). If at least some UL data for a logical channel becomes available, the UE/MAC entity may trigger a BSR (e.g., when some criteria, such as the ones specified in 3GPP TS 38.321, are also satisfied), where the BSR may be used to provide the network with information about the UL data volume and/or buffer status.

For example, when there is UL data received from the upper layer (e.g., RRC, SDAP, PDCP, and/or RLC) by the LCH (e.g., CCCH, DCCH, and/or DTCH), the MAC entity of the UE may determine that there is UL data available. If the BSR has been triggered, the UE may check whether there is any UL resource (e.g., PUSCH resource) available for (new) transmission. If there is no UL resource available, the UE may trigger an SR, where the SR may be used for requesting UL-SCH resources for a new transmission. So far as, at least, one SR is pending, the UE may check whether there is any valid PUCCH resource(s) configured for the pending SR. If there is no valid PUCCH resource, the UE may initiate an RA procedure (e.g., on an SpCell and/or a cell which UE camped on in an RRC_IDLE/RRC_INACTIVE state).

It should be noted that UL resources may be considered available when the UE/MAC entity has an active configuration for either type of configured uplink grants (e.g., type 1 or type 2), or when the UE/MAC entity has received a dynamic uplink grant, or when both of these conditions are met.

In some of the present implementations, when the UE is in an RRC_INACTIVE state, no PUCCH resource may be configured/valid. This is because the UE may reset the MAC entity and consider the TA timer expired when the UE switches its RRC state from RRC_CONNECTED to RRC_INACTIVE. When the TA timer is determined to be expired, the UE may release the PUCCH resources, e.g., associated with all the cells.

Based on the recent 3GPP NR releases (e.g., R-15 and/or R-16), when a UE is in an RRC_INACTIVE state, if the UE needs to transmit UL data, the UE may need to resume its connection (e.g., move to an RRC_CONNECTED state). To do so, the UE may initiate an RRC connection resume procedure and/or initiate a transmission of the RRCResumeRequest message. The RRCResumeRequest message may be transmitted via a logical channel (e.g., CCCH). From the UE/MAC entity's perspective, if there is UL data received by a LCH (and none of other logical channels contains any available UL data), the UE may trigger a BSR. Since there is no UL resource is available in the RRC_INACTIVE state, the UE may trigger an SR. As such, when there is no valid PUCCH resource in the RRC_INACTIVE state, the UE may initiate an RA procedure. Consequently, the UE may use the UL resource of the RA procedure to transmit the RRCResumeRequest message. In some implementations, the UL resource may be an MSG A PUSCH. In some implementations, the UL resource may be received in a RAR.

In some of the present implementations, at least three types of UL grants may be supported for UL data transmission (e.g., SDT) in the RRC_INACTIVE state. The UL grants may be provided during RA procedure with 4-step RA type, RA procedure with 2-step RA type, and/or configured PUSCH resources (e.g., CG type 1). For the RA procedure with 4-step RA type, the UE may transmit the UL data via the UL grant that is received the RAR (e.g., the UL data may be transmitted via an MSG 3). For the RA procedure with 2-step RA type, the UE may transmit the UL data via the UL grant that is preconfigured for MSG A (e.g., the UL data may be transmitted via a PUSCH resource of the MSG A). For a configured PUSCH resource, the UE may transmit the UL data via the activated/initialized configured grant (the UL data may be transmitted via the PUSCH resource of the CG). Therefore, if there are more than one types of UL grants configured for the UE, the UE may have to determine which type of UL grant has to be used to transmit the UL data (e.g., small data).

The types of UL grants may be grouped into a RACH-based mechanism (e.g., a 4-step RA type and/or a 2-step RA type) and a CG-based mechanism (e.g., configured grant type 1). Several different criteria, as discussed herein, may be determined by the UE to select a RACH-based or a CG-based mechanism for the UL data transmission (e.g., SDT) in an RRC_INACTIVE state. Additionally, in case the UE selects a RACH-based mechanism, different criteria may be determined by the UE to select a 4-step RA type or a 2-step RA type for the UL data transmission (e.g., SDT) while in the RRC_INACTIVE state.

For a RACH-based mechanism, a UE may be configured with a 2-step RA only (e.g., via rach-ConfigCommonTwoStepRA), a 4-step RA only (e.g., via rach-ConfigCommon), or both 2-step RA and 4-step RA.

In a 2-step RA, a UE may be configured with one or more PUSCH resources for MSGA. In some implementations, a UE may be configured with one or more preamble groups. More specifically, the number of PUSCH resources for MSGA may be consistent with the number of configured preamble groups in the RACH-ConfigCommonTwoStepRA parameter. More specifically, different preamble groups and/ or different PUSCH resources for MSGA may be associated with different characteristics (e.g., payload size, MCS, DMRS, number of PUSCH occasions, etc.).

In a 4-step RA, a UE may be configured with one or more preamble groups. More specifically, different preamble groups may be associated with different characteristics (e.g., payload size of MSG3).

In a CG-based mechanism, a UE may be configured with zero, one, or multiple CG resources, e.g., for SDT, and/or for UL data transmission in the RRC_INACTIVE state. In some implementations, different CG configurations/resources may have different characteristics (e.g., payload size, periodicity, MCS, the number of repetitions, number of HARQ process, etc.). In some implementations, the CG may be a dedicated PUSCH resource for a specific UE and/or a common PUSCH resource shared by a group of UEs. In some implementations, when a UE is configured with multiple CG configurations/resources, e.g., for SDT, and/or for UL data transmission in the RRC_INACTIVE state, it is possible that zero, one, or several of the CG configurations/resources are initialized/activated in the RRC_INACTIVE state. In some implementations, the UE may determine that only the initialized/activated CG configurations/resources may be valid or available for UL data transmission in the RRC_INACTIVE state.

Selection of a RACH-Based or CG-Based Mechanism for UL/Small Data Transmission in the RRC_INACTIVE State As described above, in some of the present implementations, a UE may be configured with one or more RACH resources (e.g., for 4-step RA type and/or 2-step RA type) and one or more CG resources (e.g., CG type 1), e.g., for SDT. When at least some UL data associated with at least one radio bearer/logical channel become available and/or a BSR is triggered (e.g., while the UE is in the RRC_INACTIVE state), one or more of the following alternative criteria may be applied by the UE to determine whether to use the CG configuration/resource for UL data transmission (e.g., SDT), to trigger an SR, and/or to initiate an RA procedure (and/or to initiate an RRC connection resume procedure). In some implementations, one or any combination of the following alternative criteria may be applied by the UE to determine whether there is any valid/available UL resource and/or CG resource for (new) transmission. In some implementations, one or any combination of the following alternative criteria may be applied by the UE to determine whether to transmit the UL data (e.g., small data) via a UL resource configured by the CG configuration, while the UE is in the RRC_INACTIVE state.

Criterion 1-1: Based on whether any CG configuration/resource(s) has been initialized/activated:

In some of the present implementations, whether a CG configuration/resource could be used for UL data transmission by the UE, or whether a CG configuration/resource is determined to be valid/available, may be determined based on whether a CG configuration has been initialized/activated. That is, in some implementations, if a CG configuration/resource is suspended/deactivated/released, the CG configuration/resource may not be used for UL data transmission. Similarly, if the CG configuration/resource is determined, by the UE, to be invalid/unavailable the CG configuration/resource may not be used for UL data transmission. In some implementations, the CG configuration may be initialized/activated when the CG is configured for the UE. For example, the CG configuration may be initialized/activated when the UE receives the CG configuration. In some implementations, the NW may send an indication to the UE to initialize/activate the CG configuration/resource and/or to suspend/deactivate/release the CG configuration/resource. In some implementations, the UE may receive (e.g., from the NW) a CG configuration(s) and/or an index associated with the CG configuration(s) to be initialized/activated or suspended/deactivated/released in an RRCRelease message (e.g., with suspend configuration). In some implementations, when the UE receives the RRCRelease message including a specific CG configuration, e.g., for SDT, the UE may transition to the RRC_INACTIVE state from the RRC_CONNECTED state. The UE may then initiate/activate the specific CG configuration(s), and/or suspend/deactivate/release other CG configuration(s), e.g., that are not for SDT. The UE may determine whether to use the CG configuration/resource for UL data transmission (e.g., SDT), to trigger an SR, to initiate an RA procedure (e.g., for SDT), and/or to initiate an RRC connection resume procedure, for example, based on whether any of the CG configuration(s) has been initialized and/or activated.

In some implementations, a UE may be configured with a first CG configuration when the UE is in the RRC_INACTIVE state. In some such implementations, when at least some UL data associated with a radio bearer/logical channel become available and/or a BSR is triggered (e.g., when the UE is in the RRC_INACTIVE state), the UE may determine whether to use the CG configuration/resource for UL data transmission (e.g., SDT), to trigger an SR, to initiate an RA procedure (e.g., for SDT), and/or to initiate an RRC connection resume procedure, for example, based on whether the first CG configuration has been initialized/activated. If the first CG configuration has been configured and/or initialized/activated, the UE may use the CG configuration/resource for UL data transmission (e.g., SDT). As a result, the UE may not trigger a SR, may not initiate an RA procedure, and/or may not initiate an RRC connection resume procedure. More specifically, the UE may determine whether there is a valid/available UL resource for UL data transmission (e.g., SDT) in the RRC_INACTIVE state based on whether the first CG configuration has been initialized/activated. In other words, if the first CG configuration has not been configured and/or not initialized/activated, the UE may trigger a SR, initiate an RA procedure, and/or initiate an RRC connection resume procedure.

In some implementations, a UE may be configured with multiple CG configurations, e.g., a first CG configuration and a second CG configuration, when the UE is in the RRC_INACTIVE state. In some implementations, when at least some UL data associated with a radio bearer/logical channel become available and/or a BSR is triggered (e.g., when the UE is in the RRC_INACTIVE state), the UE may determine whether to use the CG configuration/resource for UL data transmission (e.g., SDT), to trigger an SR, to initiate an RA procedure (e.g., for SDT), and/or to initiate an RRC connection resume procedure, based on whether at least one of the first and the second CG configurations has been initialized/activated. If at least one of the first and second CG configuration has been configured and/or initialized/activated, the UE may use the CG configuration/resource for UL data transmission (e.g., SDT). As a result, the UE may not trigger the SR, may not initiate the RA procedure, and/or may not initiate the RRC connection resume procedure. More specifically, the UE may determine whether there is a valid/available UL resource for UL data transmission (e.g., SDT) in the RRC_INACTIVE state based on whether the first CG configuration has been initialized/activated. In other words, if the first and second CG configurations have not been configured and/or initialized/activated, the UE may trigger the SR, initiate the RA procedure, and/or initiate the RRC connection resume procedure.

In some implementations, a specific (UL) BWP for the UE may be configured with one or more CG configurations, for example, for small data transmission while the UE in the RRC_INACTIVE state. If at least some UL data associated with a radio bearer/logical channel become available and/or a BSR is triggered while the UE is in the RRC_INACTIVE state, the UE may determine whether to use the CG configuration/resource for UL data transmission (e.g., SDT), to trigger an SR, to initiate an RA procedure (e.g., for SDT), and/or to initiate an RRC connection resume procedure, for example, based on whether at least one of the configured CG configurations of the specific (UL) BWP has been initialized/activated. When at least one of the configured CG configurations of the specific (UL) BWP has been initialized/activated, the UE may not trigger the SR and/or may not initiate the RA procedure, and/or may not initiate the RRC connection resume procedure. Otherwise, the UE may perform small data transmission via an RA procedure. In some implementations, the specific (UL) BWP described above may or may not be a (UL) BWP that is indicated/configured by the base station as a specific (UL) BWP for small data transmission. In some implementations, the specific (UL) BWP may be a determined as an active (UL) BWP while the UE is in the RRC_INACTIVE state.

In some implementations, a specific (UL) BWP for the UE may be configured with one or more CG configurations for small data transmission while the UE is in an RRC_INACTIVE state. When at least some UL data associated with a radio bearer/logical channel become available and/or a BSR is triggered while the UE is in the RRC_INACTIVE state, the UE may determine whether to use the CG configuration/resource for UL data transmission (e.g., SDT), to trigger an SR, to initiate an RA procedure (e.g., for SDT), and/or to initiate an RRC connection resume procedure, based on whether at least one of the configured CG configurations of the UL BWP has been configured with rrc-ConfiguredUplinkGrant (e.g., as defined in the 3GPP TS 38.331) and initialized/activated. If at least one of the configured CG configurations of the UL BWP has been configured with rrc-ConfiguredUplinkGrant and initialized/activated, the UE may use the CG configuration/resource for UL data transmission (e.g., SDT), and the UE may not trigger the SR, may not initiate the RA procedure, (and/or may not initiate the RRC connection resume procedure. Otherwise, the UE may perform small data transmission via an RA procedure. For example, the UE may trigger the SR, initiate the RA procedure, and/or initiate the RRC connection resume procedure. In some implementations, the specific (UL) BWP may or may not be a (UL) BWP that is indicated/configured by the base station as a (UL) BWP for small data transmission. In some implementations, the specific UL BWP may be determined as an active (UL) BWP while the UE is in the RRC_INACTIVE state.

In some implementations, a specific serving cell for the UE may be configured with one or more CG configurations for small data transmission while the UE in the RRC_INACTIVE state. If at least some UL data associated with a radio bearer/logical channel become available and/or a BSR is triggered while the UE is in the RRC_INACTIVE state, the UE may determine whether to use the CG configuration/resource for UL data transmission (e.g., SDT), to trigger an SR, to initiate an RA procedure (e.g., for SDT), and/or to initiate an RRC connection resume procedure, for example, based on whether at least one of the CG configurations for the serving cell has been initialized/activated. If at least one of the CG configurations for the serving cell has been initialized/activated, the UE may use the CG configuration/resource for UL data transmission (e.g., SDT), and the UE may not trigger the SR, may not initiate the RA procedure, and/or may not initiate the RRC connection resume procedure. Otherwise, the UE may perform small data transmission via an RA procedure. For example, the UE may trigger the SR, initiate the RA procedure, and/or initiate the RRC connection resume procedure. In some implementations, the specific serving cell for the UE may or may not be the serving cell that is indicated/configured by the base station as a serving cell for small data transmission. In some implementations, the specific serving cell may be determined as an active serving cell while the UE in the RRC_INACTIVE state.

In some implementations, a specific serving cell for the UE may be configured with one or more CG configurations for small data transmission while the UE in the RRC_INACTIVE state. If at least some UL data associated with a radio bearer/logical channel become available and/or a BSR is triggered while the UE is in the RRC_INACTIVE state, the UE may determine whether to use the CG configuration/resource for UL data transmission (e.g., SDT), to trigger an SR, to initiate an RA procedure (e.g., for SDT), and/or to initiate an RRC connection resume procedure, for example, based on whether at least one of the configured CG configurations for the serving cell has been configured with rrc-ConfiguredUplinkGrant (e.g., as defined in the 3GPP TS 38.331) and initialized/activated. If at least one of the configured CG configurations for the serving cell has been configured with rrc-ConfiguredUplinkGrant and initialized activated, the UE may use the CG configuration/resource for UL data transmission (e.g., SDT). As a result, the UE may not trigger the SR, may not initiate the RA procedure, and/or may not initiate the RRC connection resume procedure. Otherwise, the UE may perform small data transmission via an RA procedure. For example, the UE may trigger the SR, initiate the RA procedure, and/or initiate the RRC connection resume procedure. In some implementations, the specific serving cell for the UE may or may not be the serving cell that is indicated/configured by the base station as a serving cell for small data transmission. In some implementations, the specific serving cell may be determined as an active serving cell (e.g., a SpCell) while the UE in the RRC_INACTIVE state.

Criterion 1-2: Based on one or more characteristics (e.g., a payload size, a number of repetitions, periodicity, SLIV, number of HARQ process, HARQ information, timer, etc.) of CG configuration/resource.

In some implementations, a UE may be configured with one or more CG configurations. The CG configuration(s) may be initialized/activated and may include certain characteristics, such as one or more of the parameters listed below in Table 1, and/or a specific parameter that is configured in the CG configuration(s) for small data transmission °

TABLE 1

ConfiguredGrantConfig field descriptions antennaPort

Indicates the antenna port(s) to be used for this configuration, and the maximum bitwidth is 5. See TS 38.214 clause 6.1.2, and TS 38.212 , clause 7.3.1.
cg-DMRS-Configuration DMRS configuration (see TS 38.214, clause 6.1.2.3).
configuredGrant Timer Indicates the initial value of the configured grant timer (see TS 38.321) inmultiples of periodicity.
dmrs-SeqInitialization The network configures this field if transformPrecoder is disabled. Otherwise the field is absent.
frequencyDomainAllocation Indicates the frequency domain resource allocation, see TS 38.214, clause 6.1.2, and TS 38.212, clause 7.3.1).
frequencyHopping The value intraSlot enables 'Intra-slot frequency hopping' and the value interSlot enables 'Inter-slot frequency hopping'. If the field is absent, frequency hopping is not configured.
frequencyHoppingOffset Frequency hopping offset used when frequency hopping is enabled (see TS 38.214, clause 6.1.2 and clause 6.3).
mcs- Table Indicates the MCS table the UE shall use for PUSCH without transform precoding. If the field is absent the UE applies the value qam64.
mcs-TableTransformPrecoder Indicates the MCS table the UE shall use for PUSCH with transform precoding. If the field is absent the UE applies the value qam64.
mcsAndTBS The modulation order, target code rate and TB size (see TS 38.214, clause 6.1.2). The NW does not configure the values 28~31 in this version of the specification.
nrofHARQ-Processes The number of HARQ processes configured. It applies for both Type 1 and Type 2. See TS 38.321, clause 5.4.1.
p0-PUSCH-Alpha Index of the P0-PUSCH-AlphaSet to be used for this configuration.
periodicity Periodicity for UL transmission without UL grant for type 1 and type 2 (see TS 38.321, clause 5.8.2). The following periodicities are supported depending on the configured subcarrier spacing [symbols]:
15 kHz: 2, 7, n*14, where n = {1, 2, 4, 5, 8, 10, 16, 20, 32, 40, 64, 80, 128, 160, 320, 640}
30 kHz: 2, 7, n*14, where n = {1, 2, 4, 5, 8, 10, 16, 20, 32, 40, 64, 80, 128, 160, 256, 320, 640, 1280}
60 kHz with normal CP 2, 7, n*14, where n = {1, 2, 4, 5, 8, 10, 16, 20, 32, 40, 64, 80, 128, 160, 256, 320, 512, 640, 1280, 2560}
60 kHz with ECP: 2, 6, n*12, where n = {1, 2, 4, 5, 8, 10, 16, 20, 32, 40, 64, 80, 128, 160, 256, 320, 512, 640, 1280, 2560}
120 kHz: 2, 7, n*14, where n = {1, 2, 4, 5, 8, 10, 16, 20, 32, 40, 64, 80, 128, 160, 256, 320, 512, 640, 1024, 1280, 2560, 5120}
powerControlLoopToUse Closed control loop to apply (see TS 38.213 , clause 7.1.1).
rbg-Size Selection between configuration 1 and configuration 2 for RBG size for PUSCH. The UE does not apply this field if resourceAllocation is set to resourceAllocationType1. Otherwise, the UE applies the value config1 when the field is absent. Note: rbg-Size is used when the transformPrecoder parameter is disabled.
repK-RV The redundancy version (RV) sequence to use. See TS 38.214, clause 6.1.2. The network configures this field if repetitions are used, i.e., if repK is set to n2, n4 or n8. Otherwise, the field is absent.
repK The number of repetitions of K.
resourceAllocation Configuration of resource allocation type 0 and resource allocation type 1. For Type 1 UL data transmission without grant, resourceAllocation should be resourceAllocationType0 or resourceAllocationType1.

TABLE 1-continued

ConfiguredGrantConfig field descriptions rrc-ConfiguredUplinkGrant

Configuration for "configured grant" transmission with fully RRC-configured UL grant (Type 1). If this field is absent the UE uses UL grant configured by DCI addressed to CS-RNTI (Type2). Type 1 configured grant may be configured for UL or SUL, but not for both simultaneously.
srs-ResourceIndicator Indicates the SRS resource to be used.
timeDomainAllocation Indicates a combination of start symbol and length and PUSCH mapping type, see TS 38.214 [19], clause 6.1.2 and TS 38.212 , clause 7.3.1.
timeDomain Offset Offset related to SFN = 0, see TS 38.321, clause 5.8.2.
transformPrecoder Enables or disables transform precoding for type1 and type2. If the field is absent, the UE enables or disables transform precoding in accordance with the field msg3-transformPrecoder in RACH-ConfigCommon, see TS 38.214, clause 6.1.3.
uci-OnPUSCH Selection between and configuration of dynamic and semi-static beta-offset. For Type 1 UL data transmission without grant, uci-OnPUSCH should be set to semiStatic.

In some implementations, when at least some UL data associated with a radio bearer/logical channel become available and/or a BSR is triggered (e.g., when the UE is in the RRC_INACTIVE state), the UE may determine whether to use the CG configuration/resource for UL data transmission (e.g., SDT), to trigger an SR, to initiate an RA procedure (e.g., for SDT), and/or to initiate an RRC connection resume procedure, for example, based on whether one or more of the characteristics of the CG configuration/resource satisfy a specific rule. More specifically, the UE may determine whether there is a valid/available UL resource for UL data transmission (e.g., SDT) in the RRC_INACTIVE state based on whether one or more of the characteristics of the CG configuration/resource satisfy a specific rule.

In some implementations, a UE may be configured with a threshold to determine whether to use the CG configuration/resource for UL data transmission (e.g., SDT), to trigger an SR, to initiate an RA procedure (e.g., for SDT), and/or to initiate an RRC connection resume procedure by determining whether the value of a characteristic of the CG configuration/resource is higher or lower than the threshold. In some implementations, the UE may be configured with the threshold(s) by the BS via different means, such as through dedicated signaling (e.g., in the RRCRelease message with suspend configuration, etc.), through a broadcasted system information (e.g., in SIB1, other SI, small data specific system information, etc.) or through other signalings. In some implementations, once the UE receives the configured threshold(s), the UE may replace the stored threshold(s) (if any) with the received threshold(s). In some implementations, the UE may release the configured threshold(s) when the UE enters an RRC_CONNECTED or RRC_IDLE state from RRC_INACTIVE state. In some implementations, the UE may receive several different thresholds and each of these thresholds may be associated with a characteristic of the CG configuration/resource (e.g., one of a payload size of the first CG configuration, a periodicity of the first CG configuration, a number for repetition of the first CG configuration, etc.).

In some implementations, a UE may be configured with a first CG configuration when the UE is in the RRC_INACTIVE state. If at least some UL data associated with a radio bearer/logical channel become available and/or a BSR is triggered (e.g., when the UE is in the RRC_INACTIVE state), the UE may determine whether to use the CG configuration/resource for UL data transmission (e.g., SDT), to trigger an SR, to initiate an RA procedure (e.g., for SDT), and/or to initiate an RRC connection resume procedure, based on whether the data volume for the first CG configuration is lower than a threshold. If the data volume for the first CG configuration is lower than the threshold, the UE may use the CG configuration/resource for UL data transmission (e.g., SDT). If the data volume for the first CG configuration is higher than the threshold, the UE may trigger a SR, initiate an RA procedure, and/or initiate an RRC connection resume procedure. More specifically, if the data volume for the first CG configuration is lower than the threshold, the UE may determine that there is a valid/available UL resource for UL data transmission in the RRC_INACTIVE state.

In some implementations, a UE may be configured with a first CG configuration when the UE is in the RRC_INACTIVE state. If at least some UL data associated with a radio bearer/logical channel become available and/or a BSR is triggered (e.g., when the UE is in the RRC_INACTIVE state), the UE may determine whether to use the CG configuration/resource for UL data transmission (e.g., SDT), to trigger an SR, to initiate an RA procedure (e.g., for SDT), and/or to initiate an RRC connection resume procedure, for example, based on whether the periodicity of the first CG configuration is shorter than (or equal to) a threshold. If the periodicity of the first CG configuration is higher than the threshold, the UE may trigger a SR, initiate an RA procedure, and/or initiate an RRC connection resume procedure. More specifically, when the periodicity of the first CG configuration is shorter than the threshold, the UE may determine that there is a valid/available UL resource for UL data transmission in the RRC_INACTIVE state.

In some implementations, a UE may be configured with a first CG configuration when the UE is in the RRC_INACTIVE state. If at least some UL data associated with a radio bearer/logical channel become available and/or a BSR is triggered (e.g., when the UE is in the RRC_INACTIVE state), the UE may determine whether to use the CG configuration/resource for UL data transmission (e.g., SDT), to trigger an SR, to initiate an RA procedure (e.g., for SDT), and/or to initiate an RRC connection resume procedure, for example, based on whether the number of repetition for the first CG configuration is higher/lower than a threshold. If the number of repetition for the first CG configuration is not higher than the threshold, the UE may trigger a SR, initiate an RA procedure, and/or initiate an RRC connection resume procedure. More specifically, when the number for repetition of the first CG configuration is higher than a threshold, the UE may determine that there is a valid/available UL resource for UL data transmission in the RRC_INACTIVE state.

In some implementations, a UE may be configured with a timer associated with the CG configuration(s), where the timer may be used to represent whether the associated CG configuration(s)/resource(s) is valid/available, e.g., for a (new) transmission, or not. For example, based on the timer being running, the UE may determine that the associated CG configuration(s)/resource, e.g., for a (new) transmission, may be valid/available. In some implementations, when the timer is not running, the UE may determine that the associated CG configuration(s)/resource(s), e.g., for a (new) transmission, is not valid/available. In some implementations, the UE may be configured with the timer(s) by the NW via dedicated signaling (e.g., in the RRCRelease message with suspend configuration), in the broadcasted system information (e.g., SIB1, other SI, small data specific system information), etc.

In some implementations, if the timer(s) is running and the UE (in the RRC_INACTIVE state) receives the configuration for the timer(s) from the NW, the UE may ignore or may apply the configuration for the timer(s). In some implementations, the UE may release/stop the timer(s) when the UE enters an RRC_CONNECTED or an RRC_IDLE state from the RRC_INACTIVE state. In some implementations, the UE may (re)start the timer(s) when the UE receives the configuration for the timer(s). For example, the UE may (re)start the timer(s) upon receiving the configuration for the timer(s) via dedicated signaling (e.g., RRC release message). In some implementations, the UE may (re)start the timer(s) when the UE receives the CG configuration(s). In some implementations, the UE may receive several configurations for timer(s) each of which may be associated with one of a CG configurations. In some implementations, the UE may receive one configuration for timer which is associated with all the CG configuration(s) for the UE.

In some implementations, a UE may be configured with a first CG configuration when the UE is in the RRC_INACTIVE state. If at least some UL data associated with a radio bearer/logical channel become available and/or a BSR is triggered (e.g., when the UE is in the RRC_INACTIVE state), the UE may determine whether to use the CG configuration/resource for UL data transmission (e.g., SDT), to trigger an SR, to initiate an RA procedure (e.g., for SDT), and/or to initiate an RRC connection resume procedure, for example, based on whether the timer associated with the CG configuration(s) is running or not. If the timer associated with the CG configuration(s) is running, the UE may use the CG configuration/resource for UL data transmission (e.g., SDT). If the timer associated with the CG configuration(s) is not running (or expires) the UE may trigger a SR, initiate an RA procedure, and/or initiate an RRC connection resume procedure. More specifically, when the timer associated with the CG configuration(s) is running, the UE may determine that there is a valid/available UL resource for UL data transmission (e.g., SDT) in the RRC_INACTIVE state.

In some implementations, the timer may be a CG validity timer or a TA timer. For example, the timer may be used to control the release/suspension/deactivation/validity of the configured grant configuration/resource. More specifically, when the timer expires (e.g., reaches zero), the UE may determine that the associated CG configuration(s) is invalid. If the timer expires and the associated CG configuration(s) becomes invalid, the UE may release/suspend the CG configuration(s)/resource. Subsequently, when the CG configuration(s) is released/suspend, the UE may initiate an RA procedure with 2-step RA type and/or 4-step RA type for small data transmission. In some implementations, the timer may be used to control whether the Timing Advance is valid.

In some implementations, the timer may be a specific timer. The specific timer may be associated with a HARQ process. The specific timer may be (re)started when the UE receives a UL grant or DL assignment, e.g., for the corresponding HARQ process. The specific timer may be (re)started when the UL and/or DL transmission is performed, e.g., for the corresponding HARQ process. The specific timer may be stopped when the UE receives a HARQ feedback (e.g., ACK or NACK), e.g., for the corresponding HARQ process.

In some implementations, the timer may be associated with one or more CG configurations. For example, one timer may be associated with all CG configuration(s) applied by the UE. In another example, each timer may be associated with a corresponding CG configuration applied by the UE.

Criterion 1-3: Based on LCP mapping restriction.

A UE may be configured with one or more LCP mapping restrictions for (each) logical channel (e.g., when the UE is in the RRC_INACTIVE state). The LCP mapping restriction may be used to map UL data from different LCH(s) to UL resources with different characteristics. For example, the LCP mapping restrictions may be used to map UL data from different LCH(s) to different configured grant configuration(s) in the RRC_INACTIVE state, e.g., via allowedCG-List.

In some implementations, if at least some UL data associated with a radio bearer/logical channel become available and/or a BSR is triggered (e.g., when the UE is in the RRC_INACTIVE state), the UE may determine whether to use the CG configuration/resource for UL data transmission (e.g., SDT), to trigger an SR, to initiate an RA procedure (e.g., for SDT), and/or to initiate an RRC connection resume procedure, for example, based on whether the logical channel(s) satisfies the LCP mapping restriction(s). More specifically, the UE may determine whether there is a valid/available UL resource for UL data transmission (e.g., SDT) in the RRC_INACTIVE state based on whether the logical channel(s) satisfying the LCP mapping restriction(s) or not.

In some implementations, a UE may be configured with a first CG configuration when the UE is in the RRC_INACTIVE state, while the UE may be configured with an LCP mapping restriction(s) for a logical channel. If at least some UL data associated with the radio bearer/logical channel become available and/or a BSR is triggered (e.g., when the UE is in the RRC_INACTIVE state), the UE may determine whether the logical channel for the first CG resource (e.g., indicated by the first CG configuration) satisfies the LCP mapping restriction(s). If the logical channel for the first CG resource (e.g., indicated by the first CG configuration) does not satisfy the LCP mapping restriction(s), the UE may trigger a SR, initiate an RA procedure, and/or initiate the RRC resume procedure. More specifically, when the logical channel for the first CG resource (e.g., indicated by the first CG configuration) satisfies the LCP mapping restriction(s), the UE may determine that there is a valid/available UL resource for UL data transmission in the RRC_INACTIVE state.

In some implementations, the LCP mapping restriction may be indicated by different parameters. These parameters may include, but are not limited to, allowedSCS-List, which may set the allowed Subcarrier Spacing(s) for a transmission, maxPUSCH-Duration, which may set the maximum PUSCH duration allowed for a transmission, configuredGrantType1Allowed, which may determine whether a configured grant Type 1 can be used for a transmission, and allowedServingCells, which may set the allowed cell(s) for a transmission.

In some implementations, a specific LCP mapping restriction may be defined for UL data transmission in the RRC_INACTIVE state. For example, the NW may configure a parameter to control whether an LCH or a CG could or could not trigger BSR, trigger SR, and/or initiate a RA procedure, for example, via a flag.

Criterion 1-4: Based on transmission timing (or starting symbol for transmission) of the next CG resource occasion.

In some implementations, a CG resource may include a periodic UL resource (e.g., where the periodicity of the CG resource may be configured in the CG configuration). The UE may be able to determine the transmission timing (or starting symbol for the transmission) of the next CG resource occasion. If at least some UL data associated with a radio bearer/logical channel become available and/or a BSR is triggered (e.g., when the UE is in the RRC_INACTIVE state) at a first timing, the UE may determine whether to use the CG configuration/resource for UL data transmission (e.g., SDT), to trigger an SR, to initiate an RA procedure (e.g., for SDT), and/or to initiate an RRC connection resume procedure, for example, based on the time duration between the first timing and the transmission timing (or starting symbol for transmission) of the next CG resource occasion.

In some implementations, if the time duration is longer than a first threshold, the UE may trigger an SR, initiate an RA procedure, and/or initiate an RRC resume procedure. More specifically, when the time duration is shorter than the first threshold, the UE may determine that there is a valid/available UL resource for UL data transmission in the RRC_INACTIVE. In some implementations, if the time duration is shorter than a first threshold, the UE may use the CG configuration/resource for UL data transmission (e.g., SDT). In some implementations, the threshold(s) (e.g., the first threshold) may be configured by different means, as described in the present disclosure. For example, the threshold(s) may be configured in the UL data transmission (e.g., SDT) configuration(s) or in the CG configuration, may be specified in the specification, may be configured via an RRC release message (with suspend configuration), etc. In some implementations, the unit of a threshold may be a symbol, a slot, ms, etc. In some implementations, the value of a threshold may be associated with the capability of the UE.

In some implementations, the UE may be configured with the threshold(s) by the NW via dedicated signaling (e.g., in the RRCRelease message with suspend configuration). In some implementations, the UE may be configured with the threshold(s) by the NW via a broadcasted system information (e.g., in SIB1, other SI, small data specific system information).

Criterion 1-5: Based on whether the Timing Advance (TA) (e.g., for a CG) is valid.

Some implementations may leverage the TA for UL (Layer 1) synchronization. In the RRC_INACTIVE state, a UE may maintain the TA (e.g., by a TA timer). For example, when the TA timer is running, the UE may determine that the TA is valid. The BS may be responsible for maintaining the TA to keep the UL (Layer 1) synchronised, for example, by using a specific indication/signaling to update the TA value. If at least some UL data associated with a radio bearer/logical channel become available and/or a BSR is triggered (e.g., when the UE is in the RRC_INACTIVE state) at a first timing, the UE may determine whether to use the CG configuration/resource for UL data transmission (e.g., SDT), to trigger an SR, to initiate an RA procedure (e.g., for SDT), and/or to initiate an RRC connection resume procedure, for example, based on whether the TA (e.g., for a CG) is valid (e.g., whether the TA timer is running)

In some implementations, if the TA is considered not to be valid (e.g., the TA timer is not running), the UE may trigger a SR, initiate an RA procedure, and/or initiate an RRC connection resume procedure. More specifically, when the TA is considered valid (e.g., the TA timer is running), the UE may determine that there is a valid/available UL resource for UL data transmission (e.g., SDT) in the RRC_INACTIVE state. In some implementations, if the TA is considered to be valid (e.g., the TA timer is running), the UE may use the CG configuration/resource for UL data transmission (e.g., SDT).

In some implementations, the TA timer may only be maintained in the RRC_INACTIVE state. For example, the TA timer may be configured for the UE which is in the RRC_INACTIVE state (e.g., the configuration of the TA timer may be included in the RRC release message (e.g., with suspend configuration), and/or may be configured in the UL data transmission (e.g., SDT) configuration, as described above and below, and/or may be configured in the CG configuration.

In some implementations, the TA timer may include one or more parameters, such as a timeAlignmentTimer (e.g., as configured in RRC_CONNECTED), and may be (re)started when the UE (successfully) transmits data via the UL resource of the configured grant in the RRC_INACTIVE state. Additionally, the TA timer may be (re)started when the UE receives an indication/signalling from the network, where the indication/signalling may include a response to an UL transmission via the UL resource of the configured grant. Such a response may be a NACK/ACK indication which may indicate unsuccessful/successful reception of the UL transmission via the UL resource of the configured grant. The TA timer may be (re)started when the UE receives an indication from network, where the indication may be used to (re)configure/(re)initialize/activate the configured grant configuration/resource. In some implementation, the TA timer may be (re)started when the UE receives an indication from network, where the indication may be used to update the TA, e.g., a Timing Advance command MAC CE.

Additionally, the TA timer may be (re)started in some implementations when the UE receives an UL grant which may schedule a UL resource for retransmission of a configured uplink grant while the UE is in the RRC_INACTIVE state. The UE may receive such an UL grant on a PDCCH with a special RNTI provided by the network. The special RNTI may be configured in an information element (IE), such as configuredGrantConfig.

In some implementations, the TA timer may be stopped when the UE initiates an RA procedure. In some implementations, the timer may be stopped when the UE initiates an RRC connection resume procedure. In some implementations, the TA timer may be stopped when the UE enters an RRC_CONNECTED state and/or an RRC_IDLE state. Additionally, the TA timer may be stopped when an indication is received from the NW, where the indication is to release/suspend/deactivate the configured grant configuration/resource.

In some implementations, the TA timer may be stopped when the UE receives an RRC message (e.g., RRC setup, RRC resume, RRC reconfiguration, RRC reconfiguration with sync, RRC release, RRC release with suspend configuration, RRC Reestablishment, RRC Reject, MobilityFromNRCommand, etc.)

In some implementations, the TA timer may be stopped when the CG configuration/resource that the UE is using in the RRC_INACTIVE state has been reconfigured, for example, by the network. In some implementations, the TA timer may be configured via an RRC release message (e.g., with suspend configuration) or via a specific configuration for small data transmission (SDT).

Criterion 1-6: Based on the amount of (pending) UL data.

The UE may determine the amount of (pending) UL data (e.g., associated with a radio bearer/logical channel) according to a data volume calculation procedure, such as the data volume calculation procedure described in 3GPP TS 38.322 and/or TS 38.323. Alternatively, the determination for the amount of (pending) UL data may be the same as the determination of the buffer size of BSR, such as the one descried in 3GPP TS 38.321. For example, the UE/MAC entity may determine the amount of UL data available for a radio bearer/logical channel according to the data volume calculation procedure in TS 38.322 and/or TS 38.323. Alternatively, the determination for the amount of pending UL data may be based on the total amount of data available across all radio bearers/logical channels and data that is not yet associated with a radio bearer/logical channel (e.g., after all MAC PDUs have been built). The (pending) UL data may include UL data that is available for transmission in one or more layers, such as the RLC layer, the PDCP layer, the SDAP layer, and/or the RRC layer. If at least some UL data associated with a radio bearer/logical channel become available and/or a BSR is triggered (e.g., when the UE is in the RRC_INACTIVE state), the UE may determine whether to use the CG configuration/resource for UL data transmission (e.g., SDT), to trigger an SR, to initiate an RA procedure (e.g., for SDT), and/or to initiate an RRC connection resume procedure, for example, based on the amount of (pending) UL data. In some implementation, the radio bearer/logical channel may be configured specifically for SDT.

In some implementations, if the amount of (pending) UL data is higher than a threshold, the UE may trigger a SR, initiate an RA procedure, and/or initiate an RRC connection resume procedure. In some implementations, if the amount of (pending) UL data is not higher than a threshold, the UE may use the CG configuration/resource for UL data transmission (e.g., SDT). Such a threshold, as described above, may be configured in the UL data transmission (e.g., SDT) configuration(s), and/or in the CG configuration, and/or in an RRC release message (with suspend configuration).

In some implementations, the UE may be configured with the threshold(s) by the NW via dedicated signaling (e.g., in the RRCRelease message with suspend configuration) and/or via a broadcasted system information (e.g., SIB1, other SI, small data specific system information). In some implementations, the UE may release the configured threshold(s) when the UE enters an RRC_CONNECTED or RRC_IDLE state, e.g., from the RRC_INACTIVE state. In some implementations, the UE may receive several thresholds, where each of which may be associated with one of CG configurations.

In some implementations, if the amount of (pending) UL data is higher than a payload size of (all) the CG configuration, the UE may trigger a SR, initiate an RA procedure, and/or initiate an RRC connection resume procedure. More specifically, the UE may trigger a SR, initiate an RA procedure, and/or initiate the RRC connection resume procedure if the (total) payload size of (all) the (next available) CG resource(s) that are mapped to a particular LCH is smaller than the amount of (pending) UL data associated with the particular LCH. In some implementations, if the amount of the (pending) UL data is higher than a threshold, the UE may trigger a buffer status report (BSR).

Criterion 1-7: Based on with which radio bearer/LCH/LCG the data is associated.

Each logical channel type may be defined by what type of information is transferred through the corresponding logical channel. Logical channels may be categorized into different types, e.g., which are Control Channels and Traffic Channels. Control channels may be used for transferring control plane information/data. For example, Broadcast Control Channel (BCCH) is a downlink channel for broadcasting system control information. Paging Control Channel (PCCH) is a downlink channel that carries paging messages. Common Control Channel (CCCH) is a channel for transmitting control information between UEs and the network. The CCCH is used for UEs having no RRC connection with the network. Dedicated Control Channel (DCCH) is a point-to-point bi-directional channel that transmits dedicated control information between a UE and the network and is used by the UEs that have an RRC connection. In the uplink, different connections between the logical channels and the transport channels. The CCCH may be mapped to UL-SCH. The DCCH may be mapped to UL-SCH. The DTCH may be mapped to UL-SCH.

In some implementations, a UE may be configured with one or more Logical Channels, the corresponding RLC entities, and their association with radio bearers (e.g., via rlc-BearerToAddModList). Each logical channel may have its own identity. The IE LogicalChannelIdentity may be used to identify a logical channel (LogicalChannelConfig) and a corresponding RLC bearer (RLC-BearerConfig).

Each logical channel may be allocated to an LCG, for example, using the logicalChannelGroup. More specifically, one or more of the logical channels (or a list of LCHs) may be allocated to a specific LCG, where the LCHs (or the list of LCHs) in the LCG may be used for UL data transmission in the RRC_INACTIVE state. The LCHs (or a list of LCHs) may be associated with a specific SRB(s)/DRB(s), where the specific SRB(s)/DRB(s) may be configured for SDT. The specific SRB(s)/DRB(s) may be resumed when the UE initiates the SDT procedure, and/or when the RRC state of the UE is switched to the RRC_INACTIVE state (e.g., by receiving an RRC release with suspend configuration). The (identify of) (or a list of LCHs) LCHs/LCG may be configured in the UL data transmission (e.g., SDT) configuration(s). In some implementations, if at least some UL data associated with a radio bearer/logical channel become available and/or a BSR is triggered (e.g., when the UE is in the RRC_INACTIVE state), the UE may determine whether to use the CG configuration/resource for UL data transmission (e.g., SDT), to trigger an SR, to initiate an RA procedure (e.g., for SDT), and/or to initiate an RRC connection resume procedure, for example, based on with which LCH/LCG/radio bearer the UL data is associated.

In some implementations, if UL data associated with a first radio bearer/logical channel becomes available and/or a BSR is triggered by the first logical channel (e.g., when the UE is in an RRC_INACTIVE state), the UE may trigger a SR, initiate an RA procedure, and/or initiate an RRC connection resume procedure. Conversely, if UL data associated with a second radio bearer/logical channel becomes available and/or a BSR is triggered by the second logical channel (e.g., when the UE is in the RRC_INACTIVE state), the UE may not trigger the SR, may not initiate an RA procedure, and/or may not initiate the RRC connection resume procedure), for example, in a case that the UE is configured with a CG configuration and/or the CG is initialized/activated in the RRC_INACTIVE state.

In some implementations, if UL data associated with a first radio bearer/logical channel which is allocated to a first LCG becomes available and/or a BSR has been triggered by the first logical channel (e.g., when the UE is in the RRC_INACTIVE state), the UE may trigger a SR, initiate an RA procedure, and/or initiate an RRC connection resume procedure. Conversely, when UL data associated with a second radio bearer/logical channel which is allocated to the LCG becomes available and/or a BSR is triggered by the second logical channel (when the UE is in the RRC_INACTIVE state), the UE may not trigger SR, may not initiate an RA procedure, and/or may not initiate the RRC connection resume procedure), for example, when the UE is configured with a CG configuration and/or the CG is initialized in the RRC_INACTIVE state. More specifically, the LCG may be a specific LCG (e.g., LCG 0) for UL data transmission (e.g., SDT) in the RRC_INACTIVE state.

In some implementations, if UL data associated with a first logical channel which is associated with a first radio bearer becomes available and/or a BSR has been triggered by the first logical channel (when the UE is in the RRC_INACTIVE state), the UE may trigger a SR, initiate an RA procedure, and/or initiate an RRC connection resume procedure. On the other hand, if UL data associated with a second logical channel which is associated with a second radio bearer becomes available and/or a BSR is triggered by the second logical channel (when the UE is in the RRC_INACTIVE state), the UE may not trigger SR, a may not initiate RA procedure, and/or may not initiate the RRC connection resume procedure.

In some implementations, the first logical channel may be a logical channel with a specific priority (e.g., a highest priority or than a threshold). For example, if the specific priority of the logical channel is higher/lower than a threshold, the UE may trigger a SR, initiate an RA procedure, and/or initiate an RRC connection resume procedure, e.g., when the UE is configured with CG configuration and/or the CG configuration is initialized/activated in the RRC_INACTIVE state.

In some implementations, the first logical channel may be associated with a specific logical channel identity. For example, if the specific logical channel's identity (e.g., the index value assigned to the identity) is higher/lower than a threshold, the UE may trigger a SR, initiate an RA procedure, and/or initiate an RRC connection resume procedure.

In some implementations, the first logical channel may be a CCCH. In some implementations, the threshold may be configured in LogicalChannelConfig, in the UL data transmission (e.g., SDT) configuration(s), as discussed above, in the CG configuration, and/or via the RRC release message (with suspend configuration). In some implementations, if UL data associated with a first radio bearer/logical channel becomes available and/or a BSR is triggered by the first logical channel (when the UE is in the RRC_INACTIVE state), the UE may determine whether to use the CG configuration/resource for UL data transmission (e.g., SDT), to trigger an SR, to initiate an RA procedure (e.g., for SDT), and/or to initiate an RRC connection resume procedure, e.g., based on a specific IE. More specifically, the UE may determine whether to use the CG configuration/resource for UL data transmission (e.g., SDT), to trigger an SR, to initiate an RA procedure (e.g., for SDT), and/or to initiate an RRC connection resume procedure, based on the presence or the value of the specific IE. For example, if the specific IE is present (and has a value of "TRUE or "1"), the UE may trigger the SR, initiate the RA procedure, and/or initiate an RRC connection resume procedure. In some implementations, the specific IE may be configured per logical channel (e.g., configured for the first logical channel), per radio bearer, per serving cell, per MAC entity, etc.

Criterion 1-8: Based on whether a specific procedure is triggered (or pending or ongoing).

In some implementations, the specific procedure may be a procedure for generating specific information (e.g., a MAC CE). For example, the specific procedure may be referred to as BSR, SR, RA, SDT, BFR, etc. When the specific procedure is triggered (and not canceled), the UE may generate the specific information if a UL resource is available to accommodate the specific information (plus its subheader).

The specific procedure may be an RRC procedure, for example, RRC connection establishment, RRC connection re-establishment, RRC connection resume procedure, Cell (re)selection, RNA update, tracking area update, SDT procedure, etc.

The specific procedure may be a procedure for generating information in the RRC_INACTIVE state. For example, the information may include an indicator to indicate the UE's buffer status, amount of (pending) UL data, preferred RRC state, certain UE assistance information(s), UE context, UE ID, ACK/NACK information, (beam/SSB) measurement report, etc.

In some implementations, a UE may be configured with a first CG configuration (when the UE is in the RRC_INACTIVE state). If at least some UL data associated with a radio bearer/logical channel become available and/or a BSR is triggered (e.g., when the UE is in the RRC_INACTIVE state), the UE may determine whether to use the CG configuration/resource for UL data transmission (e.g., SDT), to trigger an SR, to initiate an RA procedure (e.g., for SDT), and/or to initiate an RRC connection resume procedure, for example, based on whether a specific procedure is triggered (or pending or ongoing). If the specific procedure is triggered (or pending or ongoing), the UE may or may not trigger the SR, may or may not initiate the RA procedure, and/or may or may not initiate the RRC connection resume procedure. More specifically, the UE may determine whether there is a valid/available UL resource for UL data transmission (e.g., SDT) in the RRC_INACTIVE state based on whether a specific procedure is triggered (or pending or ongoing).

Criterion 1-9: Based on DL channel's condition/quality

In some implementations, the UE may perform a measurement procedure on a DL reference signal(s) (e.g., SSB/CSI-RS) to determine the DL channel's condition/quality (e.g., based on the measurement results, such as RSRP, RSRQ, RSSI, SINR, etc.). More specifically, the DL channel's condition/quality may be measured/assessed based on the criteria for cell (re)selection.

In some implementations, the UE may be configured with a first CG configuration (when the UE is in the RRC_INAC- TIVE state). If at least some UL data associated with a radio bearer/logical channel become available and/or a BSR is triggered (e.g., when the UE is in the RRC_INACTIVE state), the UE may determine whether to use the CG configuration/resource for UL data transmission (e.g., SDT), to trigger an SR, to initiate an RA procedure (e.g., for SDT), and/or to initiate an RRC connection resume procedure, for example, based on the DL channel's condition/quality.

In some implementations, if the DL channel's condition/quality is lower than a first threshold, for example, the SSB/CSI-RS with RSRP is lower than a RSRP threshold, the UE may trigger a SR, initiate an RA procedure, and/or initiate an RRC connection resume procedure. In some implementations, if a change in the DL channel condition/quality is higher than a second threshold, for example, the comparison of the current RSRP to the stored/previous RSRP is higher than a RSRP threshold, the UE may trigger a SR, initiate an RA procedure, and/or initiate an RRC connection resume procedure. The threshold(s) may be configured in the UL data transmission (e.g., SDT) configuration(s), as described above, may be configured in the CG configuration, and/or may be configured, via the RRC release message (with suspend configuration). In some implementations, the UE may be configured with the threshold(s) by the NW via dedicated signaling (e.g., in the RRC Release message with suspend configuration) and/or a broadcasted system information (e.g., SIB1, other SI, small data specific system information). In some implementations, the UE may release the configured threshold(s) when the UE enters an RRC_CONNECTED or RRC_IDLE state, e.g., from RRC_INACTIVE state. In some implementations, the UE may receive several thresholds, where each of which may be associated with one of CG configurations.

Criterion 1-10: Based on whether a transmission (e.g., via the configured grant) has failed for a number of times, e.g., within a time period.

In some implementations, the UE may maintain a counter to count the number of times a UL (or DL) transmission (e.g., via the CG resource or other UL resource) has failed (e.g., to transmit). For example, the UE may be configured with a first CG configuration (when the UE is in the RRC_INACTIVE state). If at least some UL data associated with a radio bearer/logical channel become available and/or a BSR is triggered (e.g., when the UE is in the RRC_INACTIVE state), the UE may determine whether to use the CG configuration/resource for UL data transmission (e.g., SDT), to trigger an SR, to initiate an RA procedure (e.g., for SDT), and/or to initiate an RRC connection resume procedure, for example, based on whether the number indicated by the counter reaches a specific value (e.g., a maximum value which may be configured by the BS). In some implementations, the counter may be incremented when the UE does not transmit a UL (or DL) transmission (e.g., via configured grant resource or other UL resource) successfully, when the UE does not receive an ACK for a UL transmission (e.g., within a time window), when the UE does not transmit (or when the UE skips) an UL transmission (e.g., via configured grant resource or other UL resource), for example, due to no data arrival, or due to poor channel condition/quality, etc.

In some implementations, a counter may be associated with one or more of the configured grant configuration(s). Alternatively, each CG configuration may be associated with one individual counter. In some implementations, the counter may be reset when the UE triggers SR, initiates an RA procedure, and/or initiates an RRC connection resume procedure). In some implementations, the counter may be reset when the UE transmits a (UL/DL) transmission (e.g., via configured grant resource or other UL resource) successfully. In some implementations, the counter may be reset when the UE receives an indication from network (e.g., the indication may be a response for the UL transmission). In some implementations, the counter may be reset when the UE triggers and/or transmits SR. In some implementations, the counter may be reset when a timer, e.g., the TA timer, the CG timer, the specific timer (as described above) expires.

In some implementations, the counter may be maintained per a HARQ process. The counter associated with a HARQ process may be incremented when the UE performs (re)transmission on the HARQ process. Alternatively, the counter associated with a HARQ process may be incremented when the UE receives a scheduling for (re)transmission of the HARQ process.

In some implementations, the value of the counter may be configured in the UL data transmission (e.g., SDT) configuration(s), in the CG configuration, and/or in the RRC release message (with suspend configuration). In some implementations, the UE may be configured with the value(s) for the counter by the NW via dedicated signaling (e.g., in the RRCRelease message with suspend configuration), and/or via a broadcasted system information (e.g., SIB1, other SI, small data specific system information). In some implementations, the UE may release the configured value(s) and/or reset the counter when the UE enters an RRC_CONNECTED or RRC_IDLE state, e.g., from the RRC_INACTIVE state.

In some implementations, the UE may be configured with a timer/window to determine whether the UL/DL transmission is transmitted successfully or not during a particular time period. The timer may continue running when no DL/UL transmission has been transmitted successfully, e.g., the response of ACK/NACK has not been received for the UL transmission. The timer may be (re)started when the UE transmits a UL/DL transmission (e.g., via configured grant resource or other resources) successfully, e.g., the response of ACK has been received for the UL transmission. In some implementations, the timer may be (re)started when the UE receives an indication from network (e.g., where the indication may be a response for an UL data transmission). If the timer expires, the UE may not be able to use the CG configuration for UL data transmission (e.g., SDT), then the UE may release the CG configuration/resource.

In some implementations, the UE may be configured with a first CG configuration (when the UE is in the RRC_INACTIVE state). If at least some UL data associated with a radio bearer/logical channel become available and/or a BSR is triggered (e.g., when the UE is in the RRC_INACTIVE state), the UE may determine whether to use the CG configuration/resource for UL data transmission (e.g., SDT), to trigger an SR, to initiate an RA procedure (e.g., for SDT), and/or to initiate an RRC connection resume procedure, for example, based on whether the timer is running or not. For example, the UE may determine to use the CG configuration/resource for UL data transmission (e.g., SDT) when the timer is running. For example, the UE may determine to trigger the SR, initiate the RA procedure, and/or initiate the RRC connection resume procedure when the timer is not running, or when the timer expires.

In some implementations, one or more of the radio bearer/logical channels configured for the UE may be further configured with some specific masks/flags(s). In some such implementations, the radio bearer/logical channel that are configured with such mask/flag(s) may trigger a BSR. That is, only the radio bearer/logical channels that are configured with the mask/flag may transmit small data via an RA procedure (e.g., that is triggered by the BSR).

In some implementations, the timer may be a data inactivity timer (e.g., as described in the 3GPP TS 38.321). The timer may be (re)started when the UE/MAC entity receives a data (e.g., MAC SDU) for an LCH from the upper layers, and/or when the UE transmits a data (e.g., MAC PDU) for an LCH. Upon expiration of the timer, the UE may release the CG configuration, trigger a SR, initiate an RA procedure, and/or initiate an RRC connection resume procedure. In some implementations, the UE may further determine whether to use the CG configuration/resource for UL data transmission (e.g., SDT), to trigger an SR, to initiate an RA procedure (e.g., for SDT), and/or to initiate an RRC connection resume procedure, for example, based on whether the UL resource being (or not being) able to accommodate the specific information (e.g., the MAC CE or data).

Selection of RA Procedure with 2-Step or 4-Step RA Type for UL/Small Data Transmission in the RRC_INACTIVE State As described above two types of random access procedures may be supported/configured for the UE, a 4-step RA type that may include MSG1/MSG2/MSG3/MSG4, and a 2-step RA type that may include an MSG A/MSG B.

In some implementations, a UE may only be configured with RACH resources (e.g., no CG configuration/resource is configured at the UE), or there may be no valid/available CG resource(s) for transmission, or the UE may determine not to use the CG resource(s), for example, based on the above described criteria. In some such implementations, when at least some UL data associated with a radio bearer/logical channel become available and/or a BSR is triggered (e.g., when the UE is in an RRC_INACTIVE state), the UE may trigger a SR, initiate an RA procedure, initiate an RRC connection resume procedure, and/or select/set the RA type (e.g., either 2-step RA type or 4-step RA type) for the RA procedure.

One or more of the following alternatives may be applied for selection of a 2-step RA type or a 4-step RA type for the initiated/ongoing RA procedure, for example, at the initiation of the RA procedure (e.g., when the UE is in the RRC_INACTIVE state). It should be noted that any number of the following alternatives may be combined together to determine a selection of the RA type for the RA procedure in some implementations.

Criterion 2-1: Based on the amount of (pending) UL data.

In some implementations, when a UE initiates an RA procedure (in the RRC_INACTIVE state), if the amount of (pending) UL data is higher than a threshold, the UE may select a 4-step or a 2-step RA type at the initiation of the RA procedure. In some implementations, the threshold may be associated with a payload size of the PUSCH resource for an MSGA.

Criterion 2-2: Based on the preamble group and/or the payload size of a PUSCH resource for an MSGA.

In some implementations, a UE may be configured with a specific preamble group (e.g., preamble group A or preamble group B) that may be associated with a specific payload size of the PUSCH resource for the MSGA. For example, a first preamble group may be mapped to a first size of a PUSCH resource for the MSGA, while a second preamble group may be mapped to a second size of the PUSCH resource for the MSGA.

In some implementations, when the UE initiates an RA procedure (e.g., when the UE is in the RRC_INACTIVE state), the UE may select a 2-step RA type if the specific preamble group (e.g., for the 2-step RA) is configured. Otherwise, the UE may select a 4-step RA type.

In some implementations, when the UE initiates an RA procedure (e.g., when the UE is in the RRC_INACTIVE state), the UE may select a 2-step RA type if the specific payload size of the PUSCH resource for the MSG A is configured. Otherwise, the UE may select a 4-step RA type.

In some implementations, when the UE initiates an RA procedure (e.g., when the UE is in the RRC_INACTIVE state), the UE may select a 2-step RA type if the specific payload size is larger than a threshold. Otherwise, the UE may select a 4-step RA type Criterion 2-3: Based on which LCH/LCG/radio bearer that the data is associated with and/or which LCH/LCG/radio bearer triggers the BSR/SR/RA.

In some implementations, when the UE initiates an RA procedure (e.g., when the UE is in the RRC_INACTIVE state), the UE may select a 2-step RA type if UL data associated with a first LCH/LCG/RB becomes available and/or a BSR/SR/RA has been triggered by the first LCH/LCG/RB (e.g., when the UE is in the RRC_INACTIVE state). Otherwise, the UE may select a 4-step RA type.

In some implementations, when the UE initiates an RA procedure (e.g., when the UE is in the RRC_INACTIVE state), the UE may select a 2-step RA type if UL data associated with a first radio bearer/logical channel which is allocated to a first LCG becomes available and/or a BSR/SR/RA has been triggered by the first radio bearer/logical channel (when the UE is in the RRC_INACTIVE state). Otherwise, the UE may select a 4-step RA type.

In some implementations, when the UE initiates an RA procedure (e.g., when the UE is in the RRC_INACTIVE state), the UE may select a 2-step RA type if UL data associated with a first logical channel which is associated with a first radio bearer becomes available and/or a BSR/SR/RA has been triggered by the first logical channel (e.g., when the UE is in the RRC_INACTIVE state). Otherwise, the UE may select a 4-step RA type.

Figure 3:
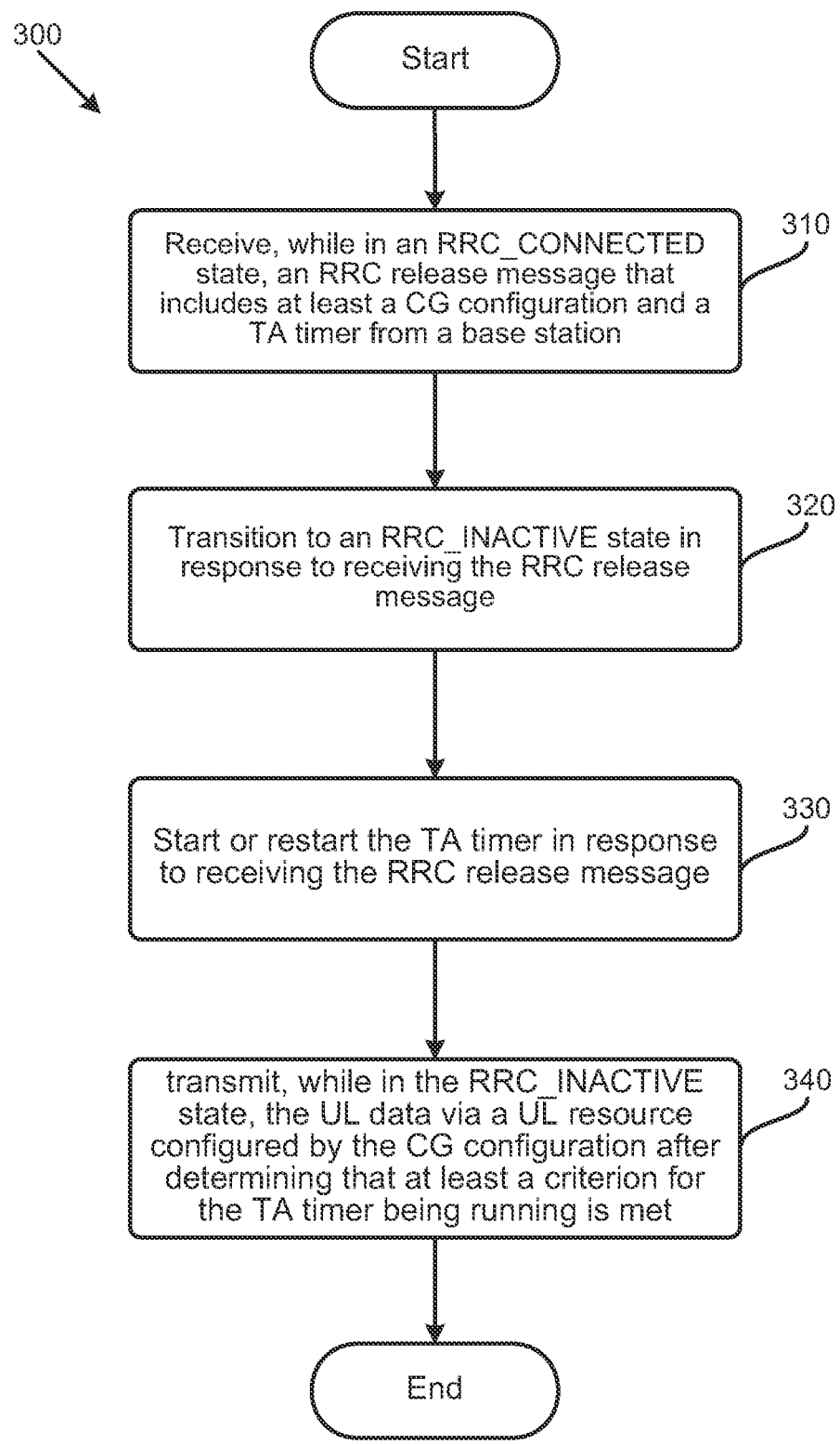
FIG. 3 is a flowchart illustrating a method (or process) performed by a UE to transmit uplink (UL) data to a base station while the UE is in an RRC_INACTIVE state, according to an example implementation of the present application.

FIG. 3 is a flowchart illustrating a method (or process) 300 performed by a UE to transmit uplink (UL) data to a base station (BS) while the UE is in an RRC_INACTIVE state, according to an example implementation of the present application. In some implementations, the UE may transmit the UL data (e.g., small data) that is associated with a specific radio bearer (RB) (e.g., a DRB or an SRB). The specific RB, in some such implementations, may be configured for small data transmission. The specific RB may be resumed while the UE in the RRC_INACTIVE state, e.g., the specific RB may be resumed when the UE initiates an SDT procedure.

As shown in the figure, process 300 may start by receiving, at 310, an RRC release message from a base station (BS), while the UE is in an RRC_CONNECTED state. The RRC release message may include configurations/IEs, such as, at least, a configured grant (CG) configuration and a time alignment (TA) timer (e.g., the value for the TA timer). In some of the present implementations, the RRC release message may further include an information element (IE), such as a suspendConfig parameter that may indicate to the UE to transition to an RRC_INACTIVE state, e.g., from the RRC_CONNECTED state.

After receiving the RRC release message, process 300 may cause the UE to transition, at 320, to the RRC_INACTIVE state, e.g., from the RRC_CONNECTED state. At 330, process 300 may start or restart the TA timer in response to receiving the RRC release message, in response to receiving the CG configuration, and/or in response to receiving the configuration of the TA timer. As described above, in some implementations, a TA timer may be configured for the UE to use in the RRC_INACTIVE state. For example, when the UE receives a specific indication to update the timing advance (e.g., a Timing Advance command), the UE may apply the Timing Advance command and (re)start the TA timer. The timing advance command may be used to update the timing advance's value for UL (Layer 1) synchronization.

At 340, process 300 may transmit, while the UE is in the RRC_INACTIVE state, the UL data (e.g., small data) via a UL resource configured by the CG configuration. The process may transmit the UL data after determining that a set of one or more criteria is met. The set of criteria, in some implementations, may include at least a criterion for the TA timer being running. While the TA timer is running (e.g., is not expired or reached zero), the UE may determine that the TA is valid and continue transmitting the UL data. In some implementations, if at least one of the set of criteria is not met, for example, if the TA timer expires (or not running), the UE may initiate an RA procedure. The process may then end.

In some implementations, another criterion in the set of criteria may include a data volume of the UL data being below a threshold. In some such implementations, the process may initiate an RRC connection resume procedure when the data volume of the UL data is above the threshold. In some implementations, the data volume may be determined based on a total amount of the UL data associated with the specific RB.

The set of criteria, in some implementations, may further include a criterion for a synchronization signal block (SSB) with reference signal received power (RSRP) being above a threshold. The set of criteria may further include a criterion for a specific timer, other than the TA timer, being running, the specific timer being started or restarted when the UE transmits the UL data via the UL resource.

Figure 4:
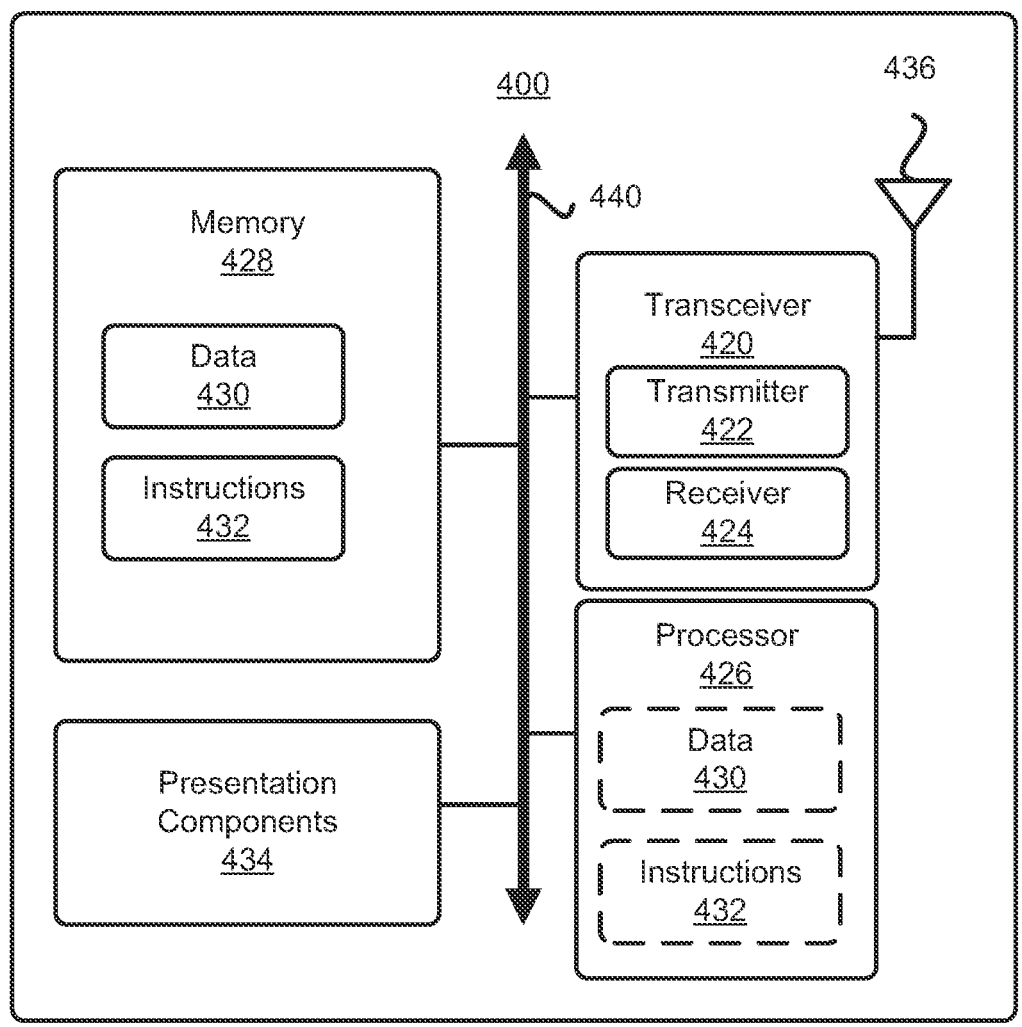
FIG. 4 illustrates a block diagram of a node for wireless communication, according to one example implementation of the present application.

FIG. 4 illustrates a block diagram of a node for wireless communication, according to one example implementation of the present application. As shown in FIG. 4, node 400 may include transceiver 420, processor 426, memory 428, one or more presentation components 434, and at least one antenna 436. Node 400 may also include a Radio Frequency (RF) spectrum band module, a base station communications module, a network communications module, and a system communications management module, input/output (I/O) ports, I/O components, and power supply (not explicitly shown in FIG. 4). Each of these components may be in communication with each other, directly or indirectly, over one or more buses 440.

Transceiver 420 having transmitter 422 and receiver 424 may be configured to transmit and/or receive time and/or frequency resource partitioning information. In some implementations, transceiver 420 may be configured to transmit in different types of subframes and slots including, but not limited to, usable, non-usable and flexibly usable subframes and slot formats. Transceiver 420 may be configured to receive data and control signalings.

Node 400 may include a variety of computer-readable media. Computer-readable media can be any available media that can be accessed by node 400 and include both volatile and non-volatile media, removable and non-removable media. By way of example, and not limitation, computer-readable media may comprise computer storage media and communication media. Computer storage media include both volatile and non-volatile, removable and non-removable media implemented in any method or technology for storage of information such as computer-readable instructions, data structures, program modules or other data.

Computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media do not comprise a propagated data signal. Communication media typically embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of any of the above should also be included within the scope of computer-readable media.

Memory 428 may include computer-storage media in the form of volatile and/or non-volatile memory. Memory 428 may be removable, non-removable, or a combination thereof. Exemplary memory includes solid-state memory, hard drives, optical-disc drives, etc. As illustrated in FIG. 4, memory 428 may store computer-readable, computer-executable instructions 432 (e.g., software codes) that are configured to, when executed, cause processor 426 to perform various functions described herein, for example, with reference to FIGS. 1 through 4. Alternatively, instructions 432 may not be directly executable by processor 426 but be configured to cause node 400 (e.g., when compiled and executed) to perform various functions described herein.

Processor 426 may include an intelligent hardware device, for example, a central processing unit (CPU), a microcontroller, an ASIC, etc. Processor 426 may include memory. Processor 426 may process data 430 and instructions 432 received from memory 428, and information through transceiver 420, the base band communications module, and/or the network communications module. Processor 426 may also process information to be sent to transceiver 420 for transmission through antenna 436, to the network communications module for transmission to a core network.

One or more presentation components 434 presents data indications to a person or other device. For example, one or more presentation components 434 include a display device, speaker, printing component, vibrating component, etc.

From the above description it is manifest that various techniques can be used for implementing the concepts described in the present application without departing from the scope of those concepts. Moreover, while the concepts have been described with specific reference to certain implementations, a person of ordinary skill in the art may recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method for a user equipment (UE) for transmitting uplink (UL) data associated with a specific radio bearer (RB), the method comprising:

receiving, while in a radio resource control (RRC) Connected state, from a base station (BS), an RRC release message that includes at least a configured grant (CG) configuration and a time alignment (TA) timer;

transitioning to an RRC Inactive state in response to receiving the RRC release message;

starting or restarting the TA timer in response to receiving the RRC release message; and transmitting, while in the RRC Inactive state, the UL data via a UL resource on a physical uplink shared channel (PUSCH) configured by the CG configuration after determining that a set of one or more criteria is met, the set of one or more criteria including at least a criterion for the TA timer being running.

2. The method of claim 1, further comprising:
starting or restarting the TA timer further in response to receiving, from the BS, while in the RRC Inactive state, an indication to update timing advance.

3. The method of claim 1, further comprising:
initiating a random access (RA) procedure when determining that one of the set of one or more criteria is not met.

4. The method of claim 1, wherein the set of one or more criteria further includes a criterion for a data volume of the UL data being lower than a threshold.

5. The method of claim 4, further comprising:
initiating an RRC connection resume procedure when the data volume of the UL data is above the threshold.

6. The method of claim 5, wherein the data volume is determined based on a total amount of the UL data associated with the specific RB.

7. The method of claim 1, wherein the set of one or more criteria further includes a criterion for a synchronization signal block (SSB) with reference signal received power (RSRP) being above a threshold.

8. The method of claim 1, wherein the set of one or more criteria further includes a criterion for a specific timer being running, the specific timer being started or restarted when the UE transmits the UL data via the UL resource.

9. The method of claim 1, wherein the specific RB is configured for small data transmission.

10. The method of claim 1, wherein the RRC release message further includes a suspendConfig information element (IE).

11. A user equipment (UE), comprising:
one or more non-transitory computer-readable media having computer-executable instructions for transmitting uplink (UL) data associated with a specific radio bearer (RB); and at least one processor coupled to the one or more non-transitory computer-readable media and configured to execute the computer-executable instructions to:

receive, while in a radio resource control (RRC) Connected state, from a base station (BS), an RRC release message that includes at least a configured grant (CG) configuration and a time alignment (TA) timer;

transition to an RRC Inactive state in response to receiving the RRC release message;

start the TA timer in response to receiving the RRC release message; and transmit, while in the RRC Inactive state, the UL data via a UL resource on a physical uplink shared channel (PUSCH) configured by the CG configuration after determining that a set of one or more criteria is met, the set of one or more criteria including at least a criterion for the TA timer being running.

12. The UE of claim 11, wherein at the least one processor is further configured to execute the computer-executable instructions to:

start or restart the TA timer further in response to receiving, from the BS, while in the RRC Inactive state, an indication to update timing advance.

13. The UE of claim 11, wherein at the least one processor is further configured to execute the computer-executable instructions to:

initiate a random access (RA) procedure when determining that one of the set of one or more criteria is not met.

14. The UE of claim 11, wherein the set of one or more criteria further includes a criterion for a data volume of the UL data being lower than a threshold.

15. The UE of claim 14, wherein at the least one processor is further configured to execute the computer-executable instructions to:

initiate an RRC connection resume procedure when the data volume of the UL data is above the threshold.

16. The UE of claim 15, wherein the data volume is determined based on a total amount of the UL data associated with the specific RB.

17. The UE of claim 11, wherein the set of one or more criteria further includes a criterion for a synchronization signal block (SSB) with reference signal received power (RSRP) being above a threshold.

18. The UE of claim 11, wherein the set of one or more criteria further includes a criterion for a specific timer being running, the specific timer being started or restarted when the UE transmits the UL data via the UL resource.

19. The UE of claim 11, wherein the specific RB is configured for small data transmission.

20. The UE of claim 11, wherein the RRC release message further includes a suspendConfig information element (IE).

* * * * *